(12) United States Patent
Komatsu

(10) Patent No.: US 9,324,153 B2
(45) Date of Patent: Apr. 26, 2016

(54) DEPTH MEASUREMENT APPARATUS, IMAGE PICKUP APPARATUS, DEPTH MEASUREMENT METHOD, AND DEPTH MEASUREMENT PROGRAM

(71) Applicant: CANON KABUSHIKI KAISHA, Tokyo (JP)

(72) Inventor: Satoru Komatsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 346 days.

(21) Appl. No.: 13/875,470

(22) Filed: May 2, 2013

(65) Prior Publication Data
US 2013/0300860 A1 Nov. 14, 2013

(30) Foreign Application Priority Data

May 11, 2012 (JP) .................................. 2012-109611
Mar. 26, 2013 (JP) .................................. 2012-064231

(51) Int. Cl.
*H04N 7/18* (2006.01)
*G06T 7/00* (2006.01)

(52) U.S. Cl.
CPC .............. *G06T 7/0051* (2013.01); *G06T 7/0069* (2013.01); *G06T 2207/10016* (2013.01)

(58) Field of Classification Search
USPC .............. 348/135, 50, 49, 48, 68, 42, 43, 370, 348/137, 140, 134, 129, 161, 179, 180, 181, 348/189, 25, 331; 382/106, 107, 131, 132, 382/154, 260, 266, 279, 280, 285, 294; 356/12
See application file for complete search history.

(56) References Cited

U.S. PATENT DOCUMENTS

| | | | |
|---|---|---|---|
| 4,965,840 A | 10/1990 | Subbarao | |
| 4,990,947 A * | 2/1991 | Komiya et al. | ............... 396/101 |
| 6,181,815 B1 * | 1/2001 | Marugame | .................... 382/154 |
| 6,229,913 B1 * | 5/2001 | Nayar et al. | ................... 382/154 |
| 6,460,003 B1 * | 10/2002 | Kump et al. | ..................... 702/85 |
| 2003/0228065 A1 * | 12/2003 | Kaltschmidt | ................. 382/260 |
| 2008/0232667 A1 * | 9/2008 | Kitamura et al. | ............. 382/132 |
| 2009/0187378 A1 * | 7/2009 | Kusunose | ..................... 702/166 |
| 2009/0208080 A1 * | 8/2009 | Grau et al. | .................... 382/131 |
| 2011/0032570 A1 * | 2/2011 | Imaizumi et al. | ............ 358/1.15 |
| 2011/0187820 A1 * | 8/2011 | Gilboa et al. | .................... 348/43 |
| 2011/0222734 A1 * | 9/2011 | Angot et al. | ................... 382/106 |

FOREIGN PATENT DOCUMENTS

| | | |
|---|---|---|
| JP | H01-167610 A | 7/1989 |
| JP | 2001-208524 A | 8/2001 |

* cited by examiner

*Primary Examiner* — Jefferey Harold
*Assistant Examiner* — Mustafizur Rahman
(74) *Attorney, Agent, or Firm* — Fitzpatrick, Cella, Harper & Scinto

(57) ABSTRACT

Provided is a depth measurement apparatus that measures depth information on a subject by using a plurality of images taken under different imaging parameters and having different blurs, the depth measurement apparatus including a spatial frequency determination unit that determines a spatial frequency band from a spatial frequency present in at least one of the plurality of images, an image comparison unit that compares the plurality of images by using the component of the spatial frequency band of the plurality of images and outputs a depth dependence value dependent on the depth of the subject, and a depth calculation unit that calculates the depth from the depth dependence value and the spatial frequency band.

16 Claims, 16 Drawing Sheets

LOW-PASS FILTER

BAND-PASS FILTER

HIGH-PASS FILTER

DEPTH MEASUREMENT APPARATUS, IMAGE PICKUP APPARATUS, DEPTH MEASUREMENT METHOD, AND DEPTH MEASUREMENT PROGRAM

BACKGROUND OF THE INVENTION

1. Field of the Invention

The present invention relates to an image processing apparatus, and particularly relates to a technology for measuring depth information on a subject from a plurality of images taken under different imaging parameters.

2. Description of the Related Art

Conventionally, as a method for acquiring the depth of an imaging scene from an image acquired by an image pickup apparatus, there is proposed a depth from defocus (DFD) method as disclosed in Japanese Patent Application Laid-open No. H01-167610. In DFD method, a plurality of images having different blurs are acquired by controlling imaging parameters of an image pickup optical system, and the correlation amount of the mutual blurs is calculated by using a measurement target pixel and its surrounding pixel in the plurality of the acquired images.

The correlation amount of the blur changes according to the depth of a subject in the image, and hence, by using the relationship, the depth is calculated from the correlation amount of the blur. Depth measurement by DFD method allows calculation of the depth by using one image pickup system so that the depth measurement thereby has an advantage that it can be incorporated in a commercial image pickup apparatus.

The depth estimation method by DFD method described in Japanese Patent Application Laid-open No. H01-167610 calculates the depth from the blur of the taken image. The size of the blur by the image pickup optical system basically changes according to the depth to the subject, and also changes according to the spatial frequency of the subject. Consequently, depth accuracy is changed according to the spatial frequency in the image. In addition, there has been a problem that, in a case where a plurality of the spatial frequencies are present in an image region used for depth measurement, depth estimation accuracy is especially reduced.

In Japanese Patent Application Laid-open No. 2001-208524, in order to cope with the case where a plurality of the spatial frequencies are present, frequency processing is performed by using different Gabor filters in three directions at three central frequencies and the depth is then calculated at each frequency. Further, threshold processing is performed on the calculated depth and a label image is generated. Then, in a local region around a depth measurement pixel, when all labels calculated by using a lower frequency are identical with each other, the label of the depth measurement pixel in the label image calculated by using a higher frequency is replaced with the label of the lower frequency.

Japanese Patent Application Laid-open No. 2001-208524 proposes a region segmentation method of the image using the depth by the method mentioned above. However, there is a problem that variations occur in depth calculation depending on the frequency of the subject due to the extraction of a frequency component by a predetermined band-pass filter.

In addition, since filter processing to a plurality of spatial frequencies and a plurality of directions is performed, there are problems such as an increase in the number of times of filtering and an increase in circuit scale.

SUMMARY OF THE INVENTION

In view of the above problems, an object of the present invention is to perform depth calculation with high accuracy even in a case where the subject has various spatial frequencies.

The first aspect of the present invention is a depth measurement apparatus for measuring depth information on a subject by using a plurality of images having different blurs taken under different imaging parameters, the depth measurement apparatus comprising: a spatial frequency determination unit configured to determine a spatial frequency band from spatial frequencies present in at least one of the plurality of images; and an image comparison unit configured to compare the plurality of images by using a component of the spatial frequency band of the plurality of images, and outputs a depth dependence value dependent on a depth of the subject.

The second aspect of the present invention is a depth measurement apparatus for measuring depth information on a subject by using a plurality of images having different blurs taken under different imaging parameters, the depth measurement apparatus comprising: a spatial frequency determination unit configured to determine a predetermined spatial frequency band including a frequency fc and a bandwidth fb satisfying the following expressions; and an image comparison unit configured to compare the plurality of images by using a component of the predetermined spatial frequency band of the plurality of images, and outputs a depth dependence value dependent on a depth:

$$0.3 \times fnq \leq fc \leq 1 \times fnq$$

$$0.1 \times fnq \leq fb \leq 0.4 \times fnq$$

wherein fnq represents a Nyquist frequency of an image pickup element that has picked up the plurality of images.

The third aspect of the present invention is a depth measurement apparatus for measuring depth information on a subject by using a plurality of images having different blurs taken under different imaging parameters, the depth measurement apparatus comprising: a weighting value determination unit configured to determine weighting values for a plurality of spatial frequency bands from a spatial frequency present in at least one of the plurality of images; and an image comparison unit configured to compare the images by using a spatial frequency band component of the plurality of images, and outputs a depth dependence value dependent on a depth for each of the plurality of spatial frequency bands.

The fourth aspect of the present invention is an image pickup apparatus comprising: an image pickup unit; and any one of the depth measurement apparatuses described above, wherein the depth measurement apparatus is configured to measure depth information on a subject in a processing target region based on a plurality of images taken under different imaging parameters by using the image pickup unit and having different blurs.

The fifth aspect of the present invention is a depth measurement method for measuring depth information on a subject by using a plurality of images having different blurs taken under different imaging parameters, the depth measurement method comprising: a spatial frequency determination step of determining a spatial frequency band from spatial frequencies present in at least one of the plurality of images; and an image comparison step of comparing the plurality of images by using a component of the spatial frequency band of the plurality of images, and outputting a depth dependence value dependent on a depth of the subject.

The sixth aspect of the present invention is a depth measurement method for measuring depth information on a subject by using a plurality of images having different blurs taken under different imaging parameters, the depth measurement method comprising: a spatial frequency determination step of determining a predetermined spatial frequency band such that a frequency fc included in the predetermined spatial frequency band and a bandwidth fb of the predetermined spatial frequency band satisfy the following expressions; and an image comparison step of comparing the plurality of images by using a component of the predetermined spatial frequency band of the plurality of images, and outputting a depth dependence value dependent on a depth:

$0.3 \times fnq \leq fc \leq 1 \times fnq$ $0.1 \times fnq \leq fb \leq 0.4 \times fnq$ wherein fnq represents a Nyquist frequency of an image pickup element that has picked up the plurality of images.

The seventh aspect of the present invention is a depth measurement method for measuring depth information on a subject by using a plurality of images having different blurs taken under different imaging parameters, the depth measurement method comprising: a weighting value determination step of determining weighting values for a plurality of spatial frequency bands from a spatial frequency present in at least one of the plurality of images; and an image comparison step of comparing the images by using a spatial frequency band component of the plurality of images, and outputting a depth dependence value dependent on a depth for each of the plurality of spatial frequency bands.

The eighth aspect of the present invention is a non-transitory computer readable medium that stores a program, wherein the program causes a computer to execute the steps of any one of the methods described above.

According to the present invention, it is possible to perform the depth calculation with high accuracy even in a case where the subject has various spatial frequencies.

Further features of the present invention will become apparent from the following description of exemplary embodiments with reference to the attached drawings.

DESCRIPTION OF THE EMBODIMENTS

First Embodiment

Hereinbelow, a description will be given of preferred embodiments of the present invention with reference to the drawings.

A first embodiment of the present invention is an image pickup apparatus 100 including a depth measurement apparatus (image processing apparatus) 110. The depth measurement apparatus 110 is an apparatus that acquires a plurality of (e.g., two) images picked up by the image pickup apparatus 100 and based on the images calculates a depth to a subject at individual positions in the image.

Figure 1:
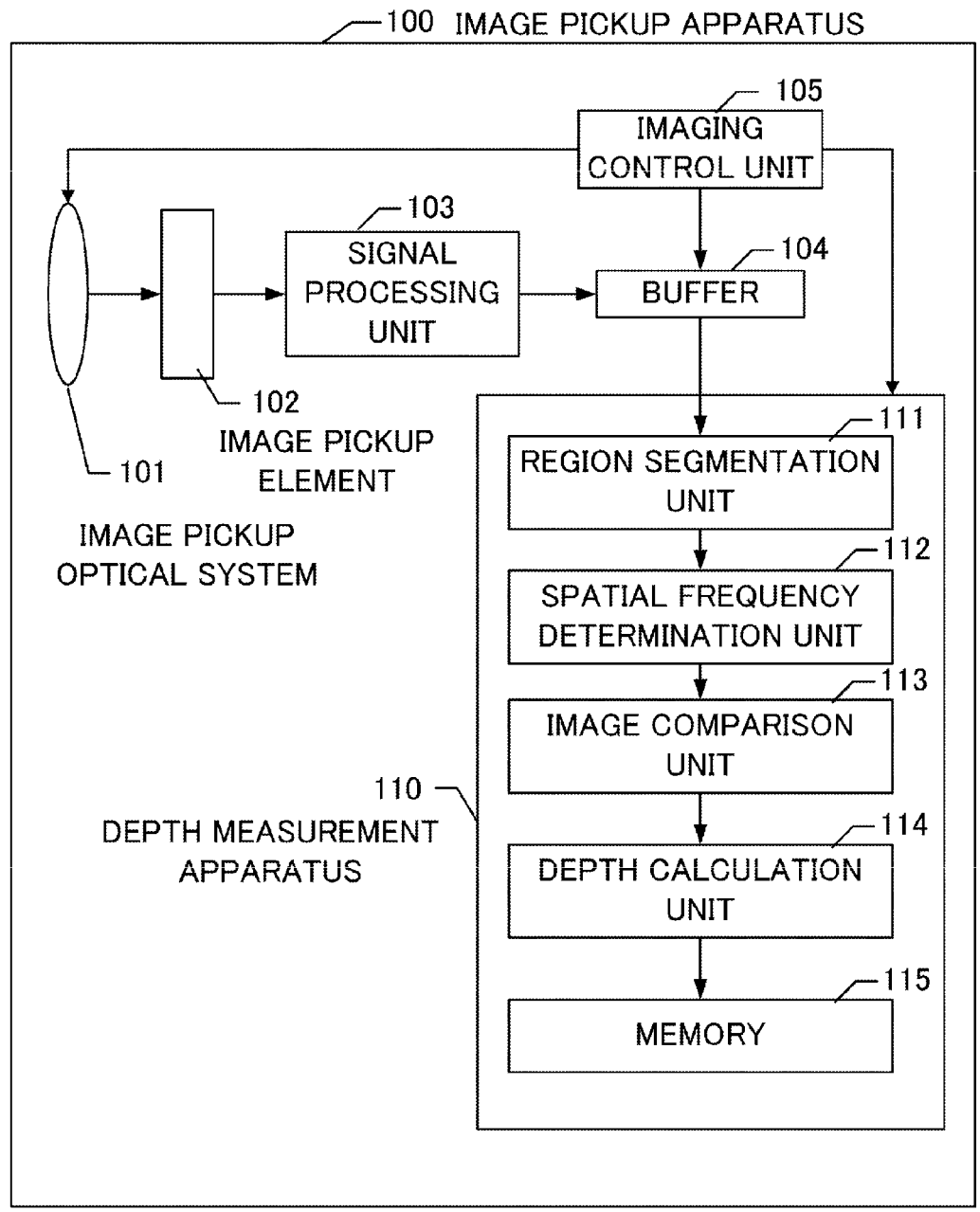
FIG. 1 is a block diagram showing the configuration of an image pickup apparatus according to a first embodiment.

FIG. 1 shows the configuration of the image pickup apparatus 100 according to the first embodiment. The image pickup apparatus 100 is constituted by an image pickup optical system 101, an image pickup element 102, a signal processing unit 103, a buffer 104, an imaging control unit 105, and the depth measurement apparatus 110. Further, the depth measurement apparatus 110 is constituted by a region selection unit 111, a spatial frequency determination unit 112, an image comparison unit 113, a depth calculation unit 114, and a memory 115.

Each of the signal processing unit 103, the imaging control unit 105, and the individual units of the depth measurement apparatus 110 can be implemented by a dedicated hardware circuit such as a semiconductor integrated circuit or the like. In addition, each of the units may also be implemented by execution of software (computer program) by a digital signal processor (DSP) or a microprocessor unit (MPU). Further, each of the units may also be implemented by a combination thereof.

The image pickup optical system 101 is a normal taking lens that is constituted by a plurality of lenses and images incident light on the image pickup element 102. The image pickup optical system 101 may be a fixed focal length lens or a zoom lens, and the present invention does not limit the kind of the image pickup optical system 101.

The image pickup element 102 may be a single-plate type image pickup element or a three-plate type image pickup element and, in a case where the image pickup element 102 is the single-plate type image pickup element, its color filter may be a RGB color filter of a Bayer array or a complementary color filter.

The signal processing unit 103 captures an image formed on the image pickup element, performs signal processing such as AD conversion, noise removal, demosaicing, brightness signal conversion, aberration correction, image magnification correction, and registration processing on the captured image, and accumulates the image in the buffer 104. Herein, it is not necessary to perform all of the signal processing, and the processing necessary for the image used for depth measurement may be selectively performed. Therefore, the image accumulated in the buffer 104 may be an image before the demosaicing or an RGB image after the demosaicing. Further, the image accumulated in the buffer 104 may also be YUV images and, among them, the image may be only a brightness signal image. However, the signal processing that does not change blurring by the image pickup optical system 101 is preferable, and the image in which a noise that affects depth information calculation and the misregistration of a plurality of images are corrected is especially preferable. Furthermore, the image having been subjected to normal signal processing may be stored separately in a memory that is not shown such that a taken image can be used for the generation of the image outputted by the normal image pickup apparatus.

The imaging control unit 105 performs control for taking a plurality of images required for depth measurement by the depth measurement apparatus 110. The imaging control unit 105 performs control in which the first image is taken and stored after performing signal processing, the second image is taken after an imaging parameter is changed, the signal processing is performed on the second image similarly to the first image, and the second image is accumulated in the buffer 104. Further, the third or subsequent image is taken on an as needed basis. The imaging parameter to be changed includes the focus position of the image pickup optical system 101, the opening size of the diaphragm in the image pickup optical system 101, or the focal length of the image pickup optical system 101.

The buffer 104 is a memory in which image data required for the depth measurement by the depth measurement apparatus 110 can be temporarily stored. The image accumulated in the buffer 104 is used for the depth calculation by the depth measurement apparatus 110.

The depth measurement apparatus 110 calculates the depth from a plurality of images taken while the imaging parameter is changed. In the present embodiment, depth calculation using a DFD method is performed. The depth calculation processing of the depth measurement apparatus 110 will be described by using the flowchart of FIG. 2.

The broad flow of the depth calculation processing is as follows. That is, first, from a depth calculation target region, an image region including a pixel required for the depth calculation processing is selected (S103). Next, from spatial frequencies present in the region selection image, a spatial frequency band used for the depth calculation is determined. More specifically, the selected region selection image is transformed into a frequency image, and a characteristic frequency band is determined (S104). The DFD method is applied to the spatial frequency band component of the characteristic frequency band of a plurality of images having different blurs, and a depth dependence value is thereby calculated (S105). The depth to the subject is calculated based on the depth dependence value (S106). In this calculation, the depth to the subject is calculated with a correction corresponding to the above characteristic frequency band reflected in the calculation. The above processing will be described hereinbelow in detail.

When imaging is performed while the imaging parameter is changed and a plurality of images are accumulated in the buffer 104, the plurality of images are sent to the depth measurement apparatus 110 and the depth calculation is started. Hereinbelow, a description will be given by using, as an example, a case where two images are taken in the present embodiment. The two taken images are designated by I1 and I2.

When the depth calculation processing is started, an image acquisition unit (not shown) of the depth measurement apparatus 110 acquires the images I1 and I2 from the buffer 104 (S100). The depth measurement apparatus 110 performs the depth calculation processing on each pixel by using the two images. Since the depth calculation can be performed on each pixel, the depths for all pixels are measured. However, it is not necessary to perform the depth calculation on all pixels. The depth measurement may be performed at intervals of several pixels, or a depth measurement pixel may be determined and the depth calculation may be performed only on the determined depth measurement pixel. In addition, the processing target region of the depth calculation processing does not need to be one pixel, and the depth calculation may also be performed on a region formed of a plurality of pixels. For example, region segmentation may be performed and for each region the depth may be measured. In the present embodiment, the depth calculation is performed on all pixels on a per pixel basis, the depth measurement pixel is determined by using X and Y coordinates in the image (S101, S102).

The depth calculation by DFD method requires the depth measurement pixel and its surrounding pixel. Accordingly, after the depth measurement pixel is determined, the region selection unit 111 cuts out the surrounding pixel required for the depth calculation (S103). At this point, in general, it is necessary to cut out the same regions in the two taken images I1 and I2. The cut-out images (image regions each including the depth measurement pixel and its surrounding pixel) are set as region selection images C1 and C2. The size of the cut-out region is preferably small in order to reduce a processing time, and is preferably large to some extent in order to suppress the influence by a noise to obtain a stable solution. In addition, the size of the cut-out region may be dependent on the size of the blur in the taken image. In the case of a compact digital camera, the size of the image pickup element is small and the size of the blur is small so that the size of the cut-out region is preferably small. Specifically, in the case of the compact digital camera, the size of the cut-out region is preferably the size of about 10 pixels in order to achieve high-speed processing, and is preferably the size of about 60 pixels in order to prevent the influence by the noise. However, when a balance therebetween is struck, the size of the cut-out region is preferably the size of about 15 to 30 pixels. The regions selected by the region selection unit 111 are outputted as the region selection images, and the region selection images are inputted to the spatial frequency determination unit 112.

Figure 3:
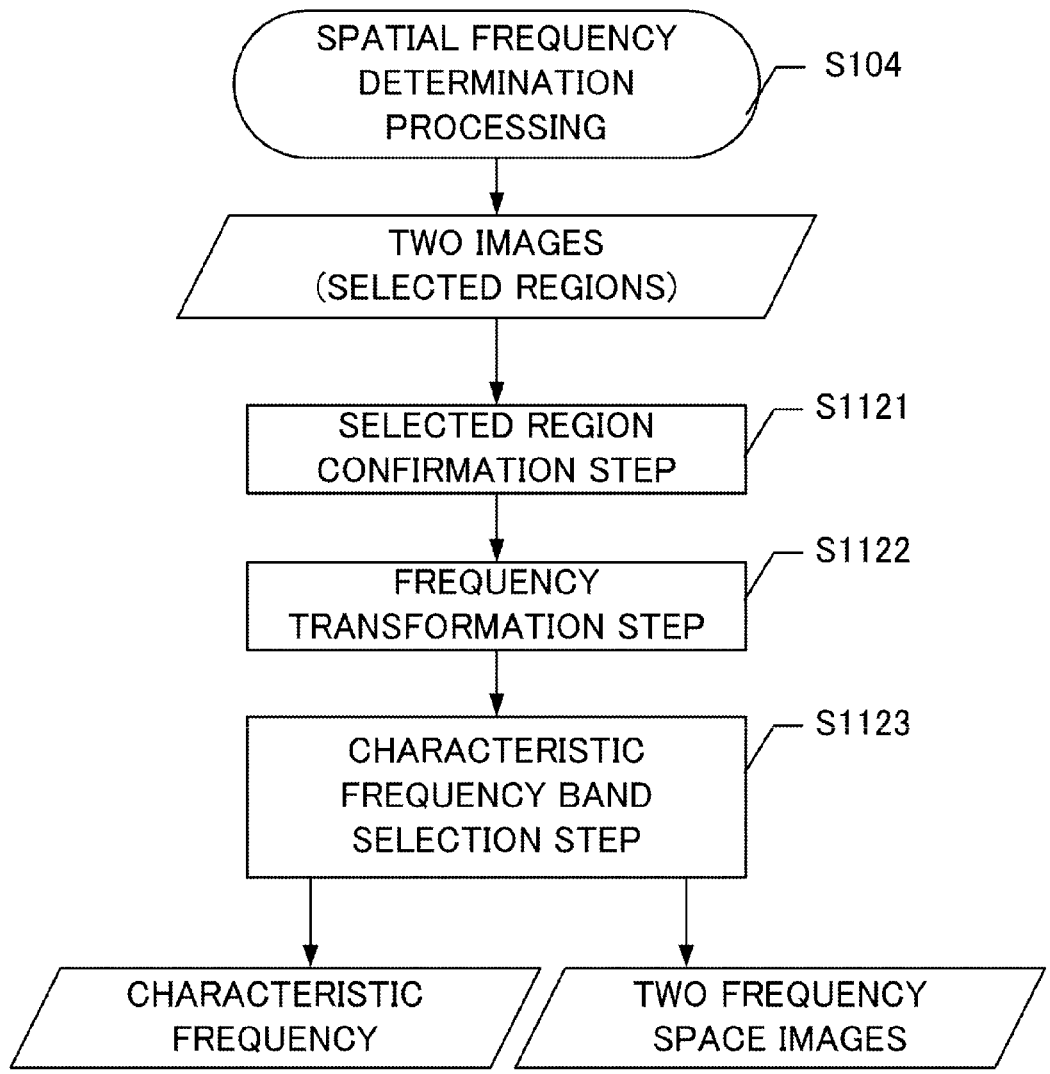
FIG. 3 is a flowchart showing the detail of spatial frequency determination processing in the first embodiment.

The spatial frequency determination unit 112 receives the region selection images C1 and C2 cutout in the region selection unit 111, analyzes the spatial frequency present in the selected regions, and determines the spatial frequency band suitable for the depth calculation (S104). FIG. 3 shows the detailed flowchart of spatial frequency determination processing S104 performed by the spatial frequency determination unit 112.

First, in a selected region confirmation step S1121, the region selection images C1 and C2 selected by the region selection unit 111 are received, and it is confirmed whether or not the sizes of C1 and C2 are identical. In a case where the sizes thereof are not identical, it is confirmed that an error has occurred so that the processing is suspended.

Next, in a frequency transformation step S1122, Fourier transformation is performed on the input images C1 and C2 to transform them into frequency space images F1 and F2. As the transformation method to the frequency space, other methods such as discrete cosine transformation and wavelet transformation may also be used in consideration of an operation amount or the like.

In a characteristic frequency band detection step S1123, the two frequency space images F1 and F2 resulting from the transformation are compared with each other, and the characteristic frequency band having a high spectrum intensity (characteristic frequency band) is detected. At this point, each of the frequency space images F1 and F2 resulting from the Fourier transformation has many low frequencies, and hence it is preferable to remove DC components and calculate a logarithm. Further, since it is known that the intensity of the frequency component is inversely proportional to a frequency f, it is preferable to perform a correction corresponding to the frequency such as multiplying the component of the frequency f by f in the calculated frequency space images F1 and F2. With this, by simply comparing the values in the frequency space images, it is possible to detect the appropriate characteristic frequency band.

Herein, the frequency band having the highest spectral intensity after the correction may be selected as the characteristic frequency band. Alternatively, the frequency band having the spectrum intensity after the correction of more than a predetermined threshold may be selected as the characteristic frequency band. Herein, in a case where a plurality of the characteristic frequency bands are present, the frequency band present in several directions may be selected as the characteristic frequency band in consideration of the direction. In addition, in a case where the characteristic frequency band is not apparent due to the presence of the frequency bands having high spectral intensities throughout from the low frequency range to the high frequency range, it is preferable to select the highest frequency band. This is because a change of the difference in blur is larger as the frequency is higher so that the depth calculation with high accuracy is allowed by selecting the high frequency. Conversely, in a case where the characteristic frequency band is not apparent because there is almost no texture in the subject, it is preferable to select the lowest frequency band among the frequency bands having high spectral intensities or suspend the processing of the pixel because the determination of the blur cannot be made and advance to the processing of the next depth measurement pixel. Thus, the pixel on which the depth measurement cannot be performed needs to be treated as an unknown pixel, or, after the depth measurement for all pixels is completed, the depth needs to be estimated from the depths around the pixel.

When the bandwidth of the frequency for the depth calculation is narrow, variations during the depth calculation are reduced, and hence it is necessary to select an especially narrow characteristic band instead of extracting all of the present frequency bands. Further, it is necessary to examine how the frequency in the selected narrow band is blurred in the other image with different imaging parameter and the characteristic frequency band is shifted, and determine the bandwidth such that the shifted frequency band is included. For example, in a case where the subject is in sharper focus in the selected region of the first image, it is considered that the characteristic frequency band is in the higher frequency region and, in the other image, it is considered that the subject is blurred and the characteristic frequency band is shifted toward the lower frequency region. The depth will be determined from the change of the blur of the same subject, and hence the bandwidth should be set such that the change of the characteristic frequency band is included.

The spatial frequency determination unit 112 outputs the determined characteristic frequency band fs and the frequency space images F1 and F2 to the image comparison unit 113.

Figure 4:
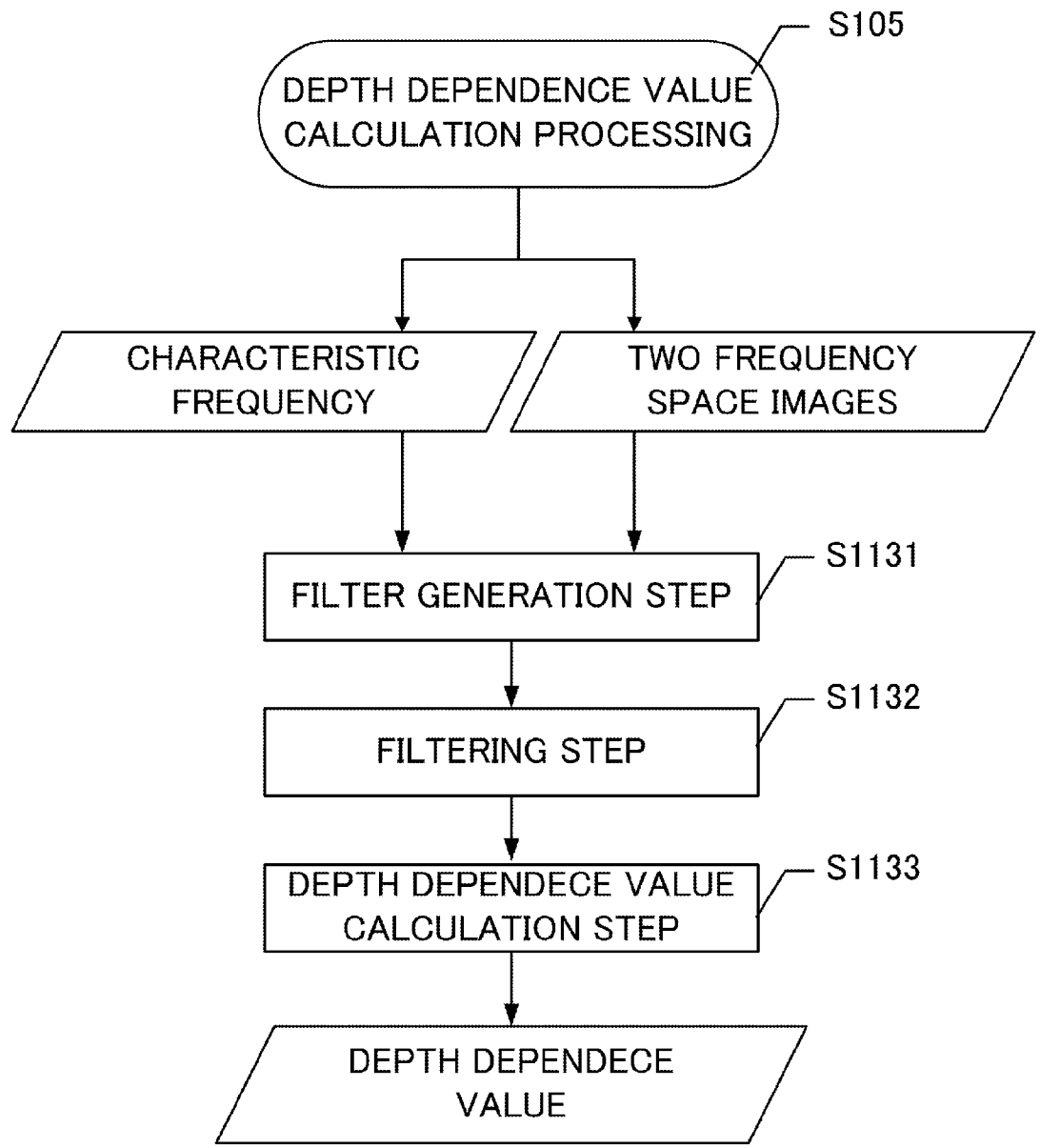
FIG. 4 is a flowchart showing the detail of depth dependence value calculation processing in the first embodiment.

In the image comparison unit 113, the depth dependence value is calculated from the characteristic frequency band fs determined in the spatial frequency determination unit 112 and the frequency space images F1 and F2 of the two images from which the regions are cut out (S105). FIG. 4 shows the flowchart of a depth dependence value calculation processing S105 performed by the image comparison unit 113.

Figure 5A:
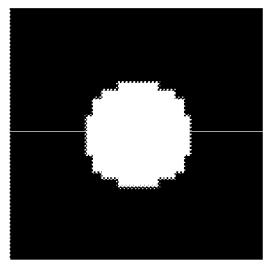
FIGS. 5A to 5C are views showing the shapes of filters in a frequency space.
Figure 5B:
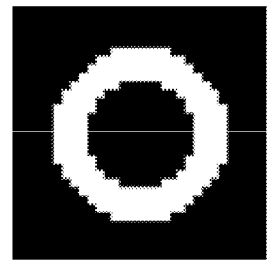
Figure 5C:
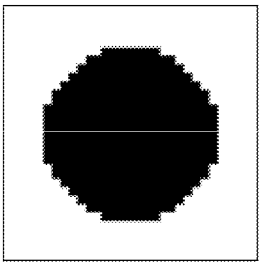

In a filter generation step S1131, a filter BF that passes the characteristic frequency band fs detected in the spatial frequency determination unit 112 is generated. The shape of the filter BF differs depending on the frequency band passed therethrough in the frequency space. For example, the shape of the filter BF becomes those shown in FIGS. 5A-5C. Note that, in FIGS. 5A-5C, a while region indicates the frequency band that is passed therethrough, while a black region indicates the frequency band that is blocked thereby.

Next, in a filtering step S1132, filtering is performed on the two cut-out images F1 and F2 by using the filter BF generated in the filter generation step S1131, and frequency space images F1' and F2' after the filtering are obtained.

Figure 6:
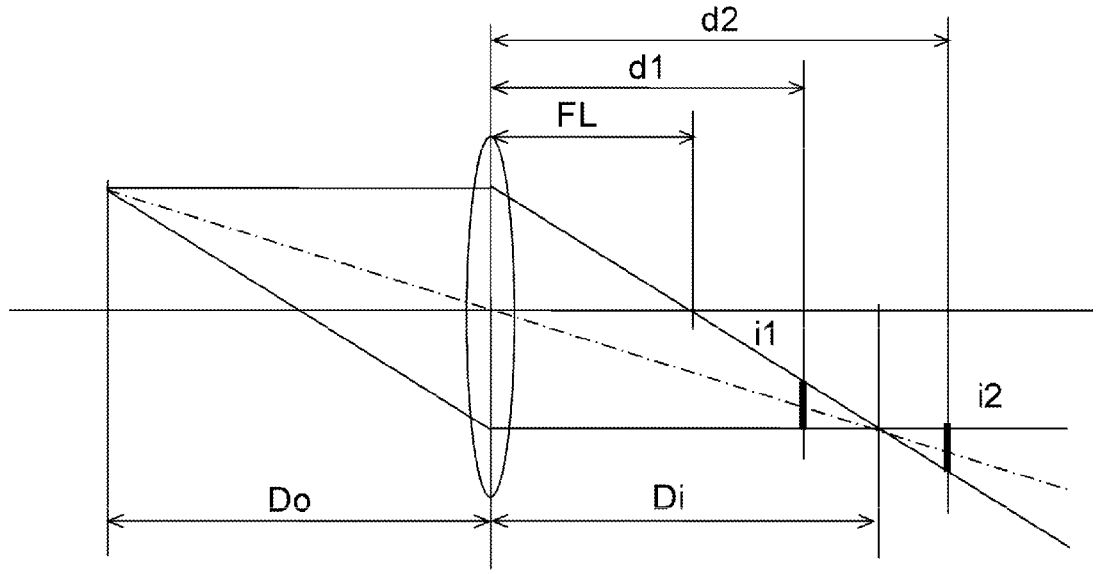
FIG. 6 is a view of geometrical optics showing the principles of a DFD method.

In a depth dependence value calculation step S1133, the depth dependence value is calculated by DFD method based on the filtered images F1' and F2'. This processing can be performed by any kind of known DFD methods. Herein, the principles of the depth calculation by DFD method will be described by using FIG. 6.

A depth Do to a depth measurement target object O can be determined by Expression 1 from the lens equation if a position Di where the object O forms an image on the image surface side is found. Herein, a focal length is designated by FL:

[Eq. 1]

$$\frac{1}{D_o} + \frac{1}{D_i} = \frac{1}{FL}.$$ (Expression 1)

However, Expression 1 can determine the depth to only the object that forms the image on the image pickup surface. An object of DFD method is to measure the depth to the object that does not form the image on the image pickup surface. In DFD method, the image formation position of the object is determined from the size of the blur (circle of confusion or blur circle) of the object projected on the image pickup surface and the depth is calculated by substituting the image formation position into Expression 1. Herein, the image formation position is determined by utilizing that the circle of confusion is proportional to the image pickup surface and the image formation position.

Here, consideration is given to a case where a given object at a depth D1 is projected at an image pickup surface position d1. At this point, an image i1 is blurred and enlarged. When it is assumed that a point spread function at this point is PSF1 and a scene is s, the image i1 is represented by the convolution of the point spread function PSF1 and the scene s.

[Eq. 2]

$$i1 = PSF1 \otimes s$$ (Expression 2)

Herein, if it is possible to model PSF by using the circle of confusion as a parameter and estimate PSF from the image i1, the circle of confusion can be calculated. Further, the image formation position can be determined from the circle of confusion, and the depth can be calculated from Expression 1.

However, the scene s is unknown in Expression 2, and hence it is not possible to correctly determine the circle of confusion. To cope with this, imaging is performed at a different image pickup surface position d2. An image obtained at this imaging is designated by i2.

Herein, when it is assumed that the Fourier transformation of the scene s is S, an optical transfer function obtained by performing the Fourier transformation of PSF1 of the first taken image is OTF1, and OTF of the second taken image is OTF2, the taken images are represented by OTF1×S and OTF2×S. The ratio between the two images is represented by the following expression:

[Eq. 3]

$$\frac{F\{i2\}}{F\{i1\}} = \frac{F\{PSF2 \otimes s\}}{F\{PSF1 \otimes s\}} = \frac{OTF2 \cdot S}{OTF1 \cdot S} = \frac{OTF2}{OTF1} = OTF_r. \quad \text{(Expression 3)}$$

OTFr representing the ratio of OTF that does not depend on the scene is calculated. It is possible to calculate the circle of confusion of the object O from Expression 1 and the geometric relationship in FIG. 6 and calculate the depth.

In the depth dependence value calculation step S1133, the ratio of OTF is calculated based on the input images F1' and F2' having been subjected to the filtering. When the selected scene is designated by Ss, OTFr is represented by the following expression:

[Eq. 4]

$$OTF_r = \frac{F1'}{F2'} = \frac{OTF1 \cdot S_s \cdot BF}{OTF2 \cdot S_s \cdot BF}. \quad \text{(Expression 4)}$$

Since the value of OTF changes depending on the spatial frequency, it follows that the spatial frequency is limited by the filter BF. With this, OTFr has the ratio of OTF of the limited spatial frequency, and hence it is possible to reduce variations in the change of OTF by the spatial frequency, and depth accuracy is thereby improved. In the depth dependence value calculation step S1133, the ratio of OTF (OTFr) is outputted as the depth dependence value. The depth dependence value calculated by the image comparison unit 113 is inputted to the depth calculation unit 114.

Figure 7:
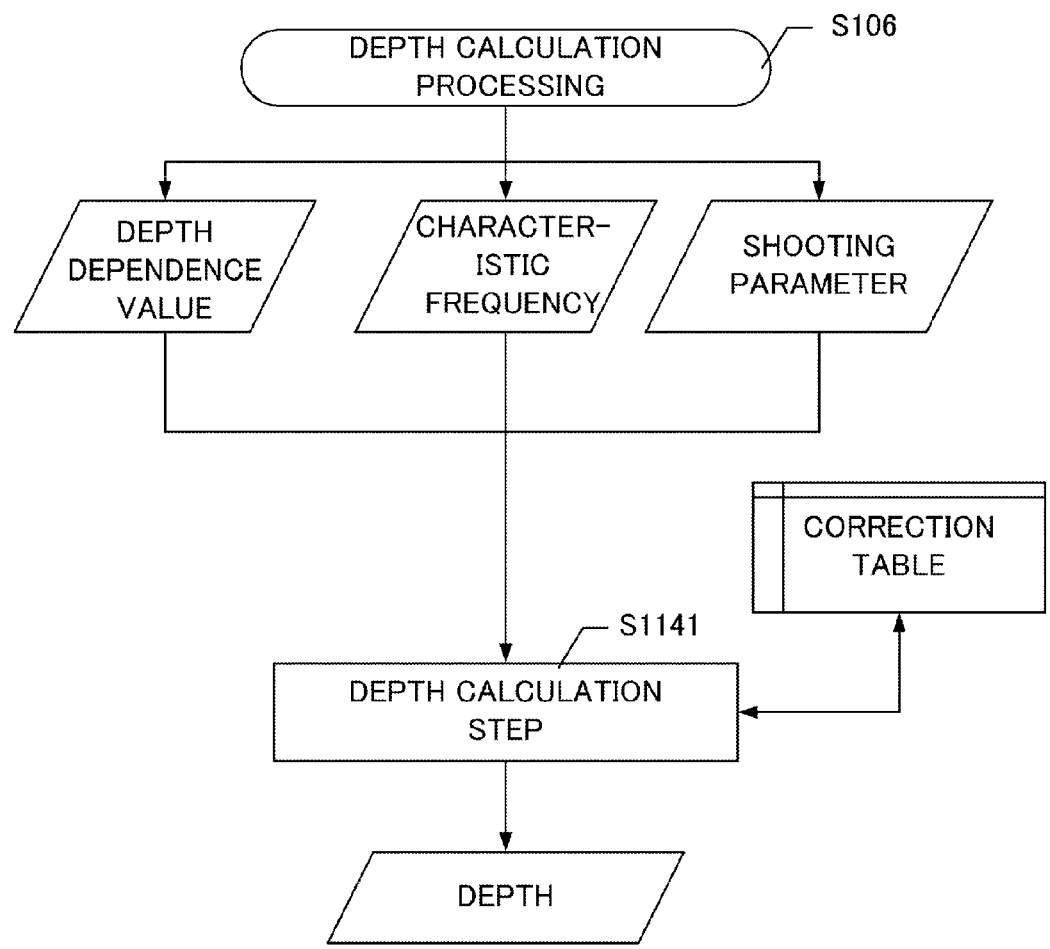
FIG. 7 is a flowchart showing the detail of depth calculation processing in the first embodiment.

The depth calculation unit 114 corrects the depth dependence value to calculate the depth from the characteristic frequency band fs determined by the spatial frequency determination unit 112, the depth dependence value calculated by the image comparison unit 113, and the imaging parameter (S106). FIG. 7 shows the flowchart of the depth calculation processing S106 performed by the depth calculation unit 114.

The depth calculation unit 114 has a correction table prepared in advance, and calculates the depth to the subject based on the correction table and the inputted depth dependence value, characteristic frequency band, and imaging parameter. The correction table stores the imaging parameter, the OTFr value in a case where the spatial frequency is given, and the depth corresponding to the OTFr value. When the imaging parameter, the characteristic frequency, and the depth dependence value OTFr are inputted, a depth calculation step S1141 selects the corresponding depth from the correction table and outputs the selected depth. Herein, the imaging parameter is information on the focal length and the focus position during the imaging.

The outputted depth dependence value differs depending on DFD method, and hence the correction table needs to be prepared according to the method. The correction table may be held in the form of a function, or may also be held as a pre-calculated lookup table.

The depth finally calculated in the depth calculation unit 114 is stored in the memory 115 (S107). With this, the depth calculation of one depth measurement pixel is completed.

Figure 2:
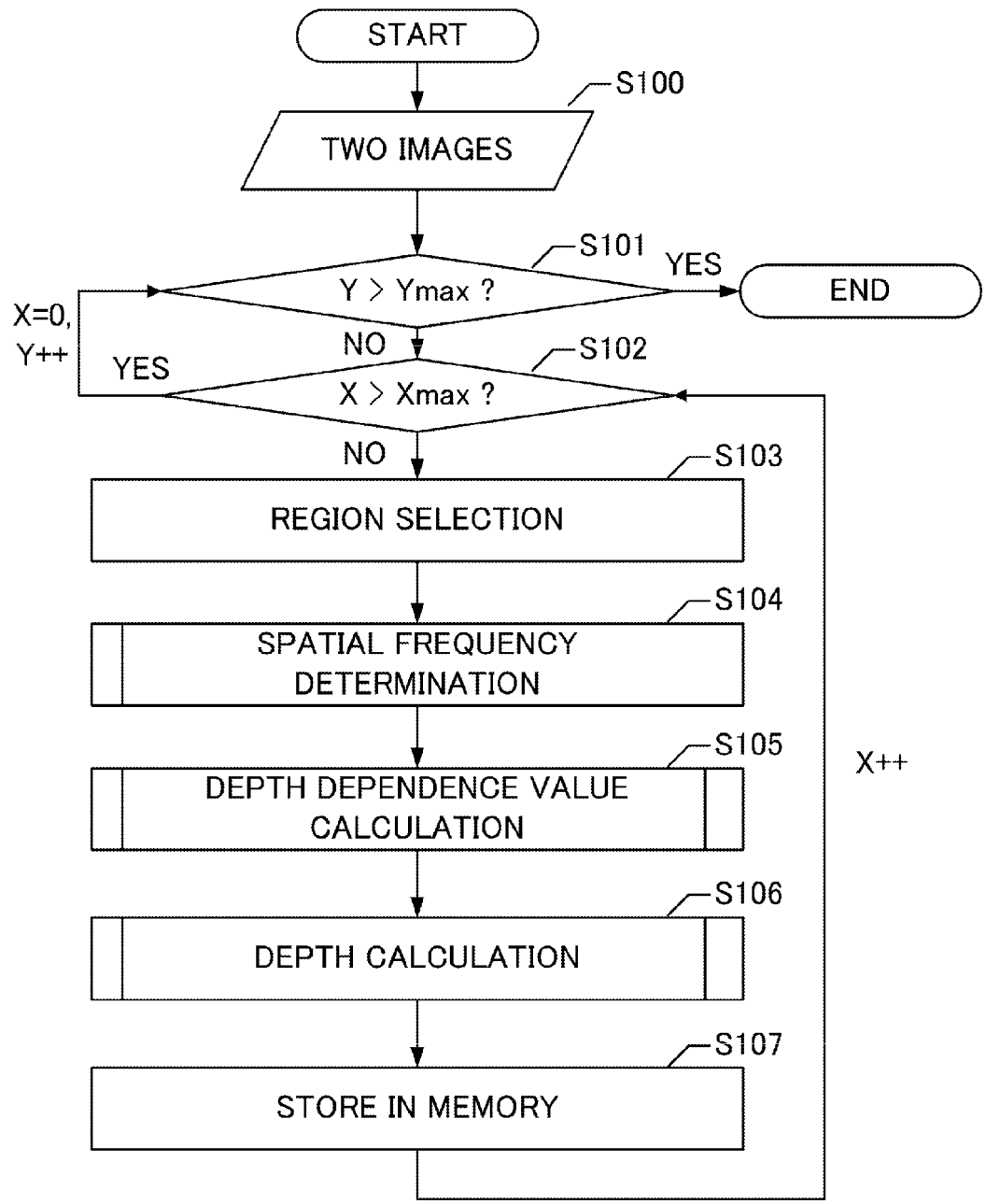
FIG. 2 is a flowchart of depth measurement processing according to the first embodiment.

The same processing is repeatedly performed on all of the depth measurement pixels (S101 and S102 in FIG. 2).

Although the depth calculated herein is the depth on the object side, the depth to be calculated is not necessarily the depth on the object side, and the depth on the image side may also be calculated. In addition, the relative depth from the focus position on the image side may be calculated. Further, depending on a use, without calculating the depth from the depth dependence value, the depth dependence value itself may be outputted as it is.

In the present embodiment, although the description has been given by using the depth measurement by DFD processing performed on the image transformed into the frequency space image as the example, in general, DFD method is a method for determining the depth by extracting the change of the blur from a plurality of the images taken while the imaging parameter is changed, and a plurality of methods are present. The present invention is not intended to limit the kind of DFD method but intended to improve the accuracy and the robustness of DFD method, and can be applied to various DFD methods.

As described above, the depth measurement apparatus according to the present embodiment analyzes the spatial frequency of the taken image in the depth information acquisition by DFD method, selects the characteristic spatial frequency band included in the taken image, and performs DFD processing. With this, the adaptive depth calculation using the spatial frequency in the narrow band present in the taken image is performed, and it becomes possible to reduce the degradation of the depth estimation accuracy caused by a difference in spatial frequency.

Note that, in the above description, the spatial frequency band used for the depth calculation is determined based on the frequency space images F1 and F2 obtained by transforming the two region selection images C1 and C2 into the frequency space images. However, the frequency band may be determined based on only one image. That is, the characteristic frequency band in the frequency space image of one of the region selection images is determined, and the spatial frequency band including the characteristic frequency band may be determined as the frequency for the depth calculation.

Second Embodiment

Figure 8:
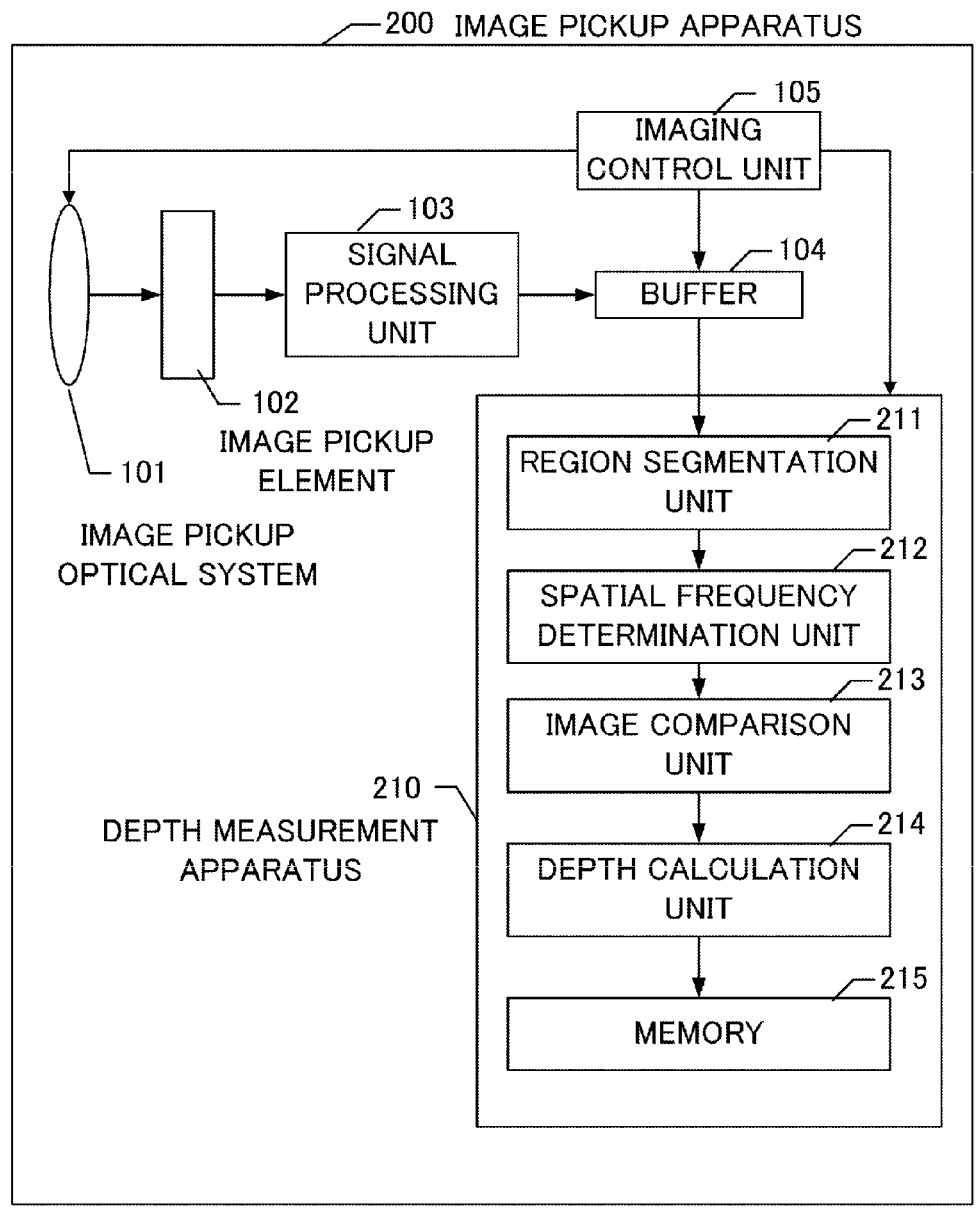
FIG. 8 is a block diagram showing the configuration of an image pickup apparatus according to a second embodiment.

FIG. 8 shows the configuration of an image pickup apparatus 200 according to the present embodiment. As shown in the drawing, although the configuration itself is the same as that of the first embodiment, the present embodiment is different from the first embodiment in the method for calculating the characteristic spatial frequency. Specifically, the operations of a depth measurement apparatus 210 are different and, among them, the operations of a spatial frequency determination unit 212 and an image comparison unit 213 are different.

In the present embodiment, the frequency analysis in the frequency space is not performed, and the determination of the characteristic frequency band is performed by the filtering of a real space image using a plurality of real space filters that are prepared in advance. Hereinbelow, a detailed description will be given of the operations of the spatial frequency determination unit 212 and the image comparison unit 213 that are different from those in the first embodiment.

The detailed operation of the spatial frequency determination unit 212 will be described by using the flowchart of FIG. 9A. First, in a selected region confirmation step S2121, the region selection images C1 and C2 selected by a region selection unit 211 are received and it is confirmed whether or not the sizes of C1 and C2 are identical.

In a filter selection step S2122, a desired filter is selected from two or more filters prepared in advance in a database. Examples of the prepared filter include a high-pass filter, a band-pass filter, and a low-pass filter that are designed to pass different frequency bands. In the case of using a low-pass filter, there are cases where the change in blur cannot be recognized, and hence a low-pass filter is not necessarily required, and a plurality of band-pass filters may appropriately be prepared instead. In a case where a narrower frequency band is needed to be extracted, a plurality of the band-pass filters may appropriately be prepared and applied. In addition, when the sizes of the input images C1 and C2 are small, only two types of the filters may be used and the load of the processing can be reduced by using only two types of the filters.

The filter prepared herein is not a filter in frequency space but a filter applied on the image in real space. For example, a differential filter such as a Laplacian filter or the like can be used as the high-pass filter, and a Gaussian filter can be used as the low-pass filter. In addition, a Laplacian of Gaussian (LoG) filter, a Difference of Gaussian (DoG) filter, or a Gabor filter can be used as the band-pass filter.

In the filter selection step S2122, the filter that passes the highest frequency band is selected from among the prepared filters, and the selected filter is used in the next step. The reason for the selection is that, since the change in blur is large in the high frequency range, the change in blur can be recognized more easily and the depth calculation with high accuracy is possible. However, it is not possible to determine the depth in the region blocked by the high-pass filter, it is necessary to perform the processing while gradually shifting the transmitted frequency band toward the low-frequency side.

In a filtering step S2123, filtering is performed on the input images C1 and C2 using the filter selected in the filter selection step S2122, and filtering images Cf1 and Cf2 are thereby generated. The filtering is performed on real space images, and hence, in a case where the images are processed using a hardware circuit, Fourier transformation is not required so that the circuit scale does not need to be increased.

In a threshold determination S2124, a variance is calculated in each of the images Cf1 and Cf2 having been subjected to the filtering, and it is determined whether or not the variance is more than a preset threshold. In a case where the variance is more than the threshold, it is presumed that the images have strong components in the frequency bands corresponding to the applied filter, and the frequency band of the applied filter and the two images Cf1 and Cf2 having been subjected to filtering are outputted. In a case where the variance is not more than the threshold, the processing returns to the filter selection step S2122 in which the filter with the second highest passband is selected and the same processing is repeated. Thus, the comparison between the filtering result and the threshold is performed sequentially from the filter having the highest passband in descending order, and the filter (frequency band) with which the output exceeding the threshold can be obtained first is selected as the characteristic frequency band fs.

Note that, in a case where only the low frequency band is included in the image, the lowest passband among the prepared filters are considered as the characteristic frequency band and the characteristic frequency band fs and the two images Cf1 and Cf2 having been subjected to the lowest filter are outputted, and the operation of the spatial frequency determination unit 212 is ended.

Herein, as the image used for the threshold determination, both of C1f and C2f may be used, or one of the images may be used as the reference. In other words, the characteristic frequency band fs may be determined from at least one image. In such a case, it is preferable to select the image having the better focus if the images are taken while the focus position is shifted and, it is preferable to select the image having a deeper depth of field if the images are taken while the opening is changed.

Although the variance of the image after the filtering has been used as the value for the threshold determination, the threshold determination value does not need to be the variance, and other statistic can also be used as long as the statistic can determine the intensity of the frequency component passed through the filter.

Figure 9A:
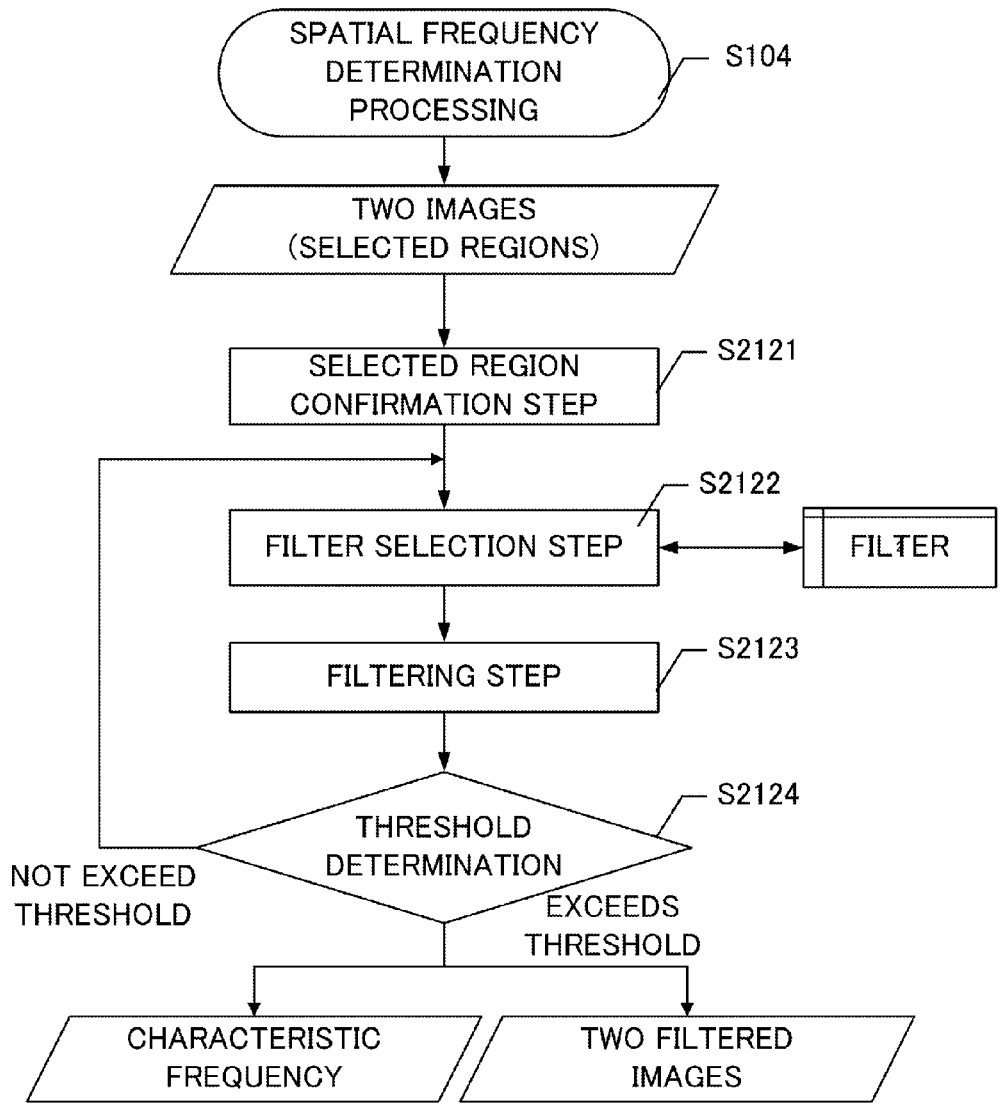
FIGS. 9A and 9B are flowcharts showing the detail of spatial frequency determination processing in the second embodiment.
Figure 9B:
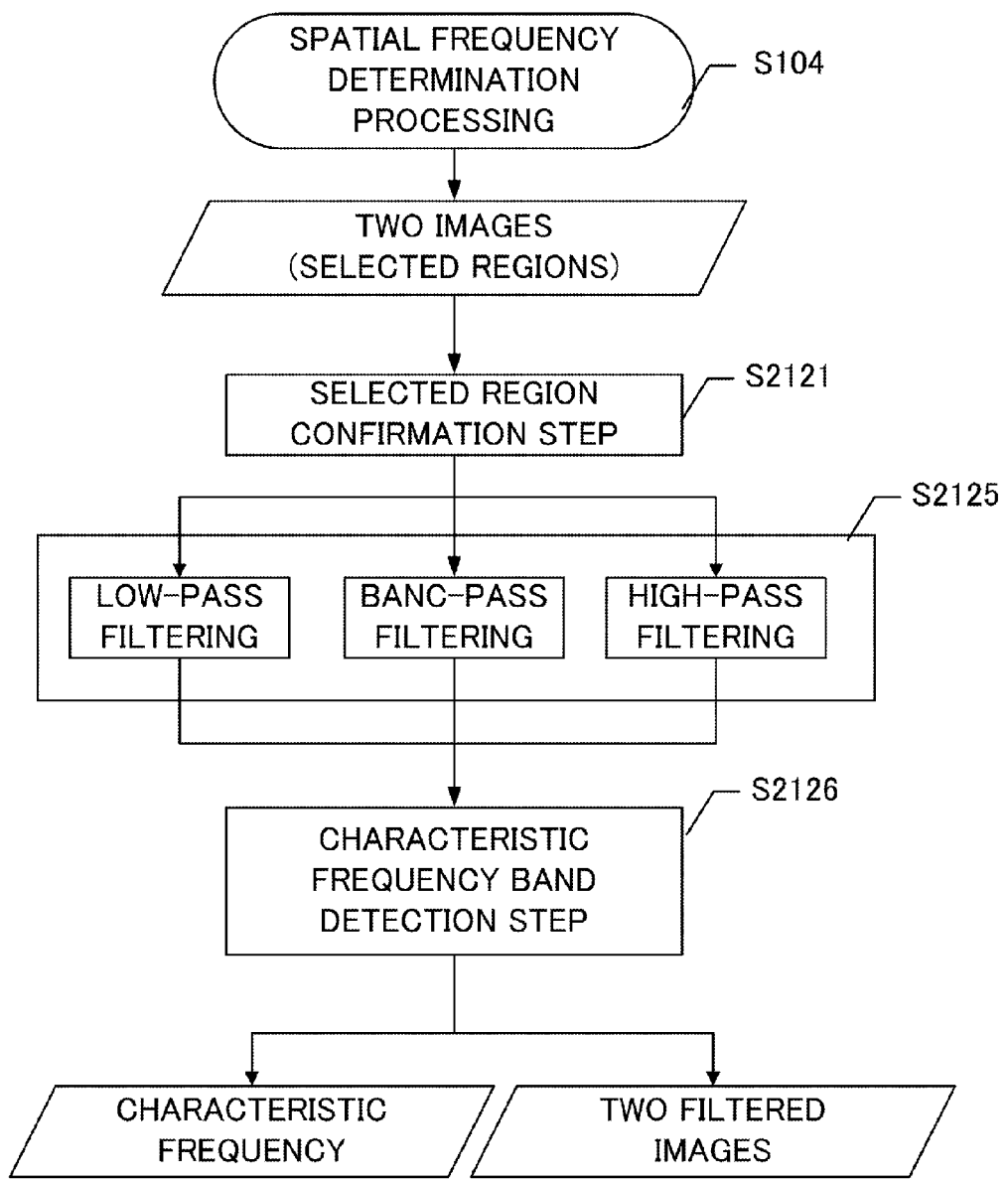

The flowchart of FIG. 9A shows the processing method that reduces the circuit scale by reducing the number of filtering circuits to one at the cost of the speed. An alternative method which allows higher-speed processing is shown in FIG. 9B.

In this flow, the filter selection step S2122 is omitted, and a filtering step by a plurality of fixed filters is prepared in a filtering step S2125. With this, filtering by the plurality of filters is simultaneously performed.

Next, in a characteristic frequency band detection step S2126, a plurality of images having been subjected to the filtering are received, the threshold determination is sequentially performed from the result of the high-pass filter similarly to the threshold determination S2124, and the characteristic frequency and the filtering images are outputted. In the case of the processing of the flowchart of FIG. 9B, although it is necessary to have a plurality of filtering circuits and memories, high-speed processing is possible.

Figure 10:
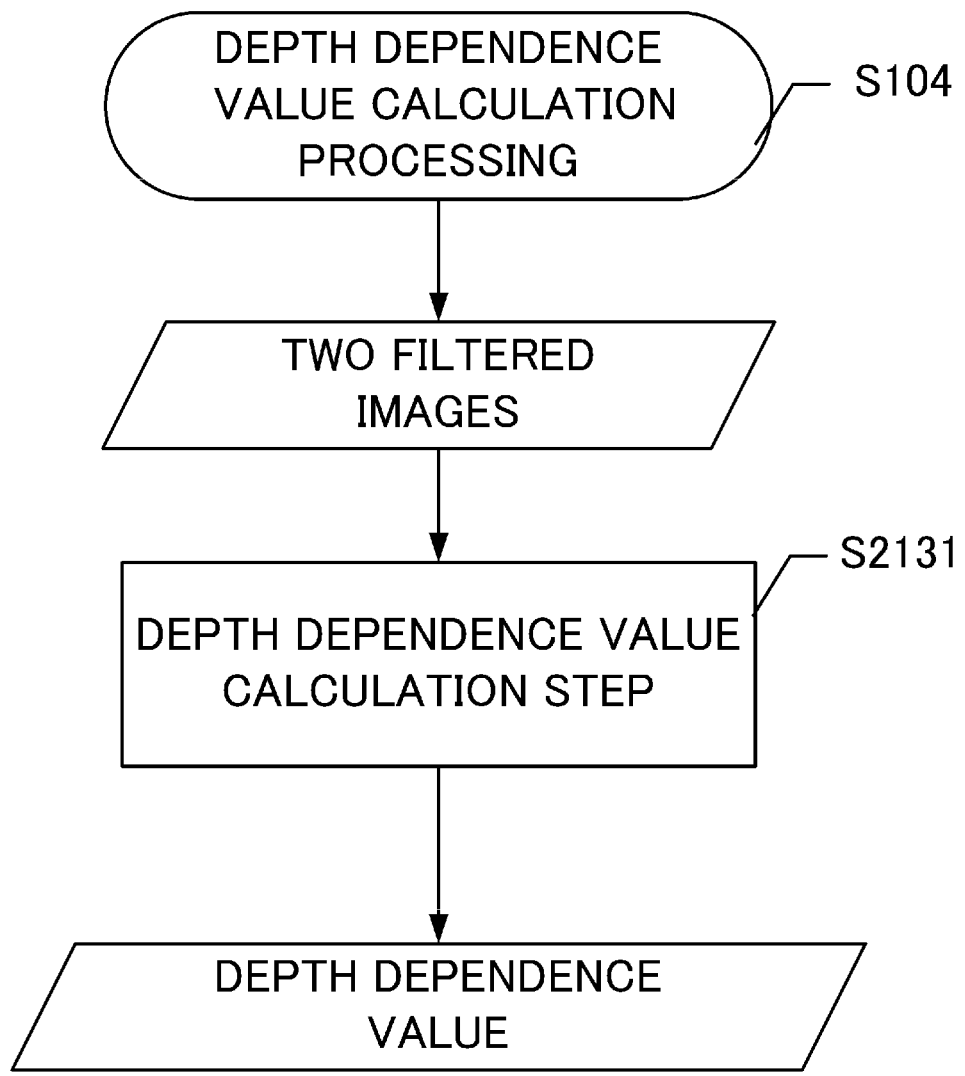
FIG. 10 is a flowchart showing the detail of depth dependence value calculation processing in the second embodiment.

The image comparison unit 213 calculates the depth dependence value from the two images Cf1 and Cf2 having been subjected to the filtering that are calculated in the spatial frequency determination unit 212. FIG. 10 shows the flowchart of depth dependence value calculation processing performed by the image comparison unit 213.

The image comparison unit 213 calculates the depth dependence value by DFD method based on the real space according to a depth dependence value calculation step S2131. As the method, it is possible to use, e.g., a normalized cross-correlation. The normalized cross-correlation NCC of the input filtering images Cf1 and Cf2 can be calculated by the following expression:

[Eq. 5]

$$NCC = \frac{\sum (Cf1 - \overline{Cf1})(Cf2 - \overline{Cf2})}{\sqrt{\sum (Cf1 - \overline{Cf1})^2 \sum (Cf2 - \overline{Cf2})^2}}.$$  (Expression 5)

The result of the calculation is outputted as the depth dependence value.

The processing for determining the depth to the subject from the depth dependence value, the characteristic frequency band, and the imaging parameter is the same as the processing (FIG. 7) in the first embodiment so that the description thereof is omitted.

The DFD processing in the real space described in the present embodiment can be applied to the first embodiment. For example, after the filtering step S1132 of the image comparison unit 113 in the first embodiment, F1' and F2' are transformed back into real space images by inverse Fourier transformation and C1' and C2' are thereby obtained. The correlation of the blur is determined by calculating the normalized cross-correlation of C1' and C2' in the depth dependence value calculation step S1133, and the depth dependence value is thereby determined. In this manner, DFD processing in the present embodiment can be applied to the first embodiment.

In the present embodiment, it is possible to determine the characteristic frequency by using the filtering result in the real space without performing the transformation into the frequency space using the Fourier transformation or the analysis, and it becomes possible to enhance the accuracy in depth measurement without increasing the circuit scale.

Third Embodiment

Figure 11:
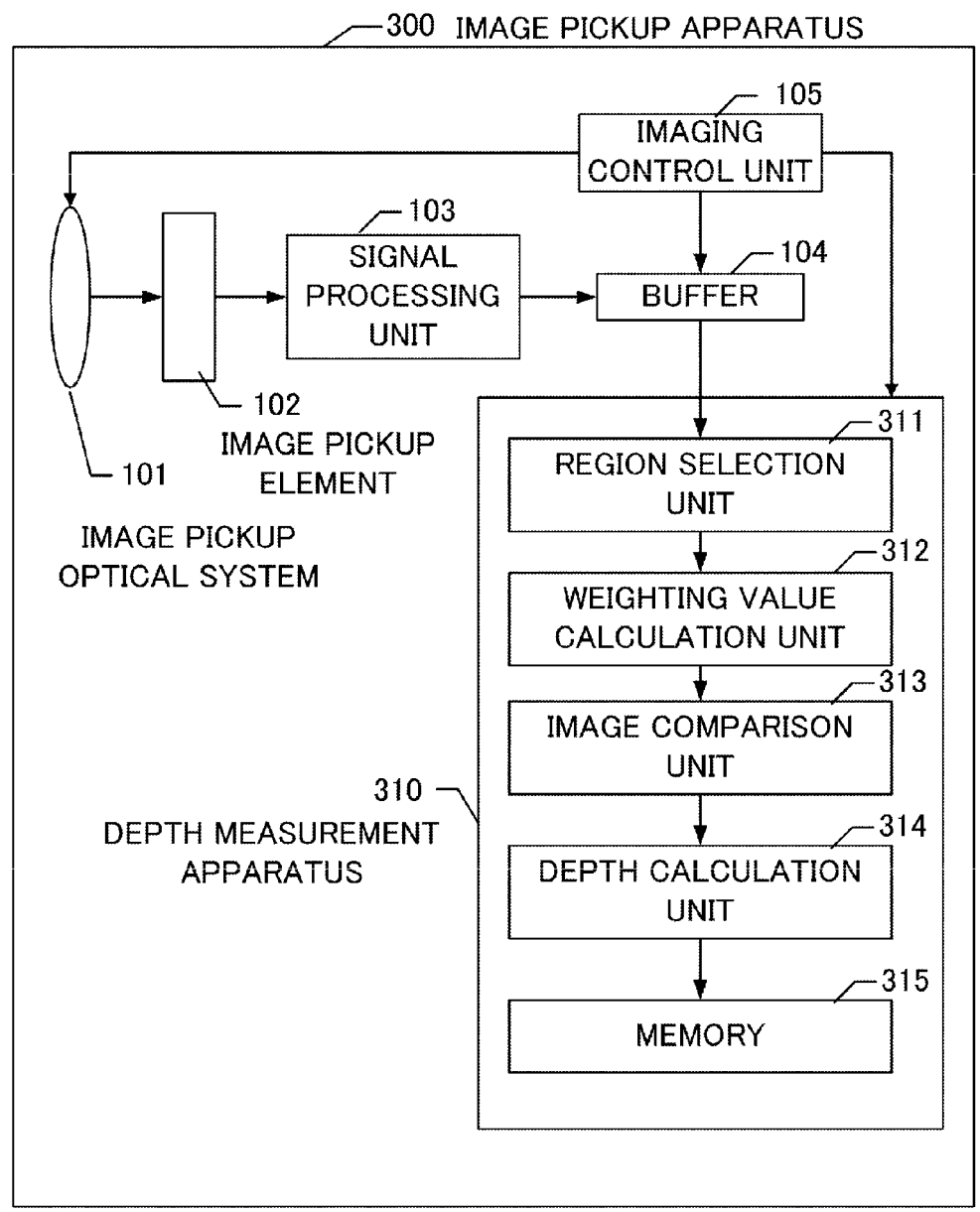
FIG. 11 is a block diagram showing the configuration of an image pickup apparatus according to a third embodiment.

FIG. 11 shows the configuration of an image pickup apparatus 300 according to the present embodiment. The depth measurement apparatus of the present embodiment is basically the same as that of the second embodiment, but is different from that of the second embodiment in that, instead of selecting the spatial frequency for the depth calculation, depths are calculated from a plurality of the spatial frequencies, and the depth to the subject is determined by calculating a weighted average of the depths. Consequently, a depth measurement apparatus 310 according to the present embodiment is provided with a weighting value calculation unit 312 instead of the spatial frequency determination unit 212. In addition, the operations of an image comparison unit 313 and a depth calculation unit 314 are different from those of the second embodiment.

Hereinbelow, a detailed description will be given of the operations of the weighting value calculation unit 312, the image comparison unit 313, and the depth calculation unit 314 that are different from those of the second embodiment.

Figure 12:
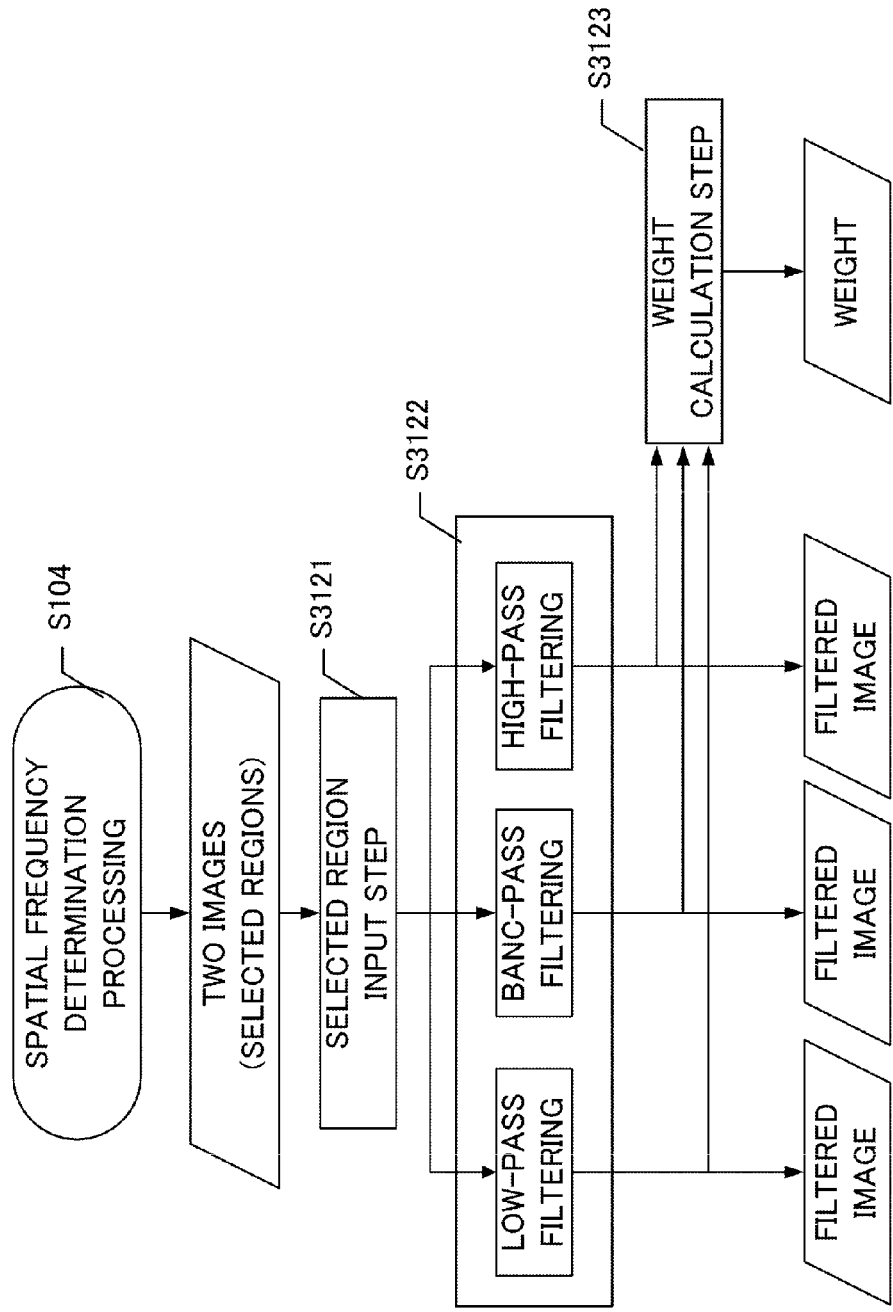
FIG. 12 is a flowchart showing the detail of weighting amount determination processing in the third embodiment.

In the weighting value calculation unit 312, as shown in the flowchart of FIG. 12, similarly to FIG. 9B of the second embodiment, after the selected region is confirmed in a selected region confirmation step S3121, filtering is performed by using a plurality of filters having different passbands that are prepared in advance in a filtering step S3122. Although three filters of the low-pass filter, the band-pass filter, and the high-pass filter are used in this step, the number of filters may be an arbitrary number. In addition, instead of using the low-pass filter and the high-pass filter, only a plurality of the band-pass filters may be used.

A plurality of images having been subjected to the filtering are inputted to a weighting value calculation step S3123, and the weight corresponding to the result after the filtering is calculated for each filtering image. The weight is calculated as a larger value as the intensity of the frequency component passed through the filter is larger. For example, the weight is calculated from the statistic such as the variance of each filtering image of the image at the desired focus position in a case where images are taken while the focus position is changed. The weight may calculated from one image instead of two (or plural) images.

In the image comparison unit 313, the depth dependence value is calculated from two images filtered by the same filter. The image comparison unit 313 is different from the second embodiment in that the depth dependence values in number equal to the number of filters are calculated. Note that the depth dependence value calculation processing is the same as that in the second embodiment so that the detailed description thereof is omitted.

Figure 13:
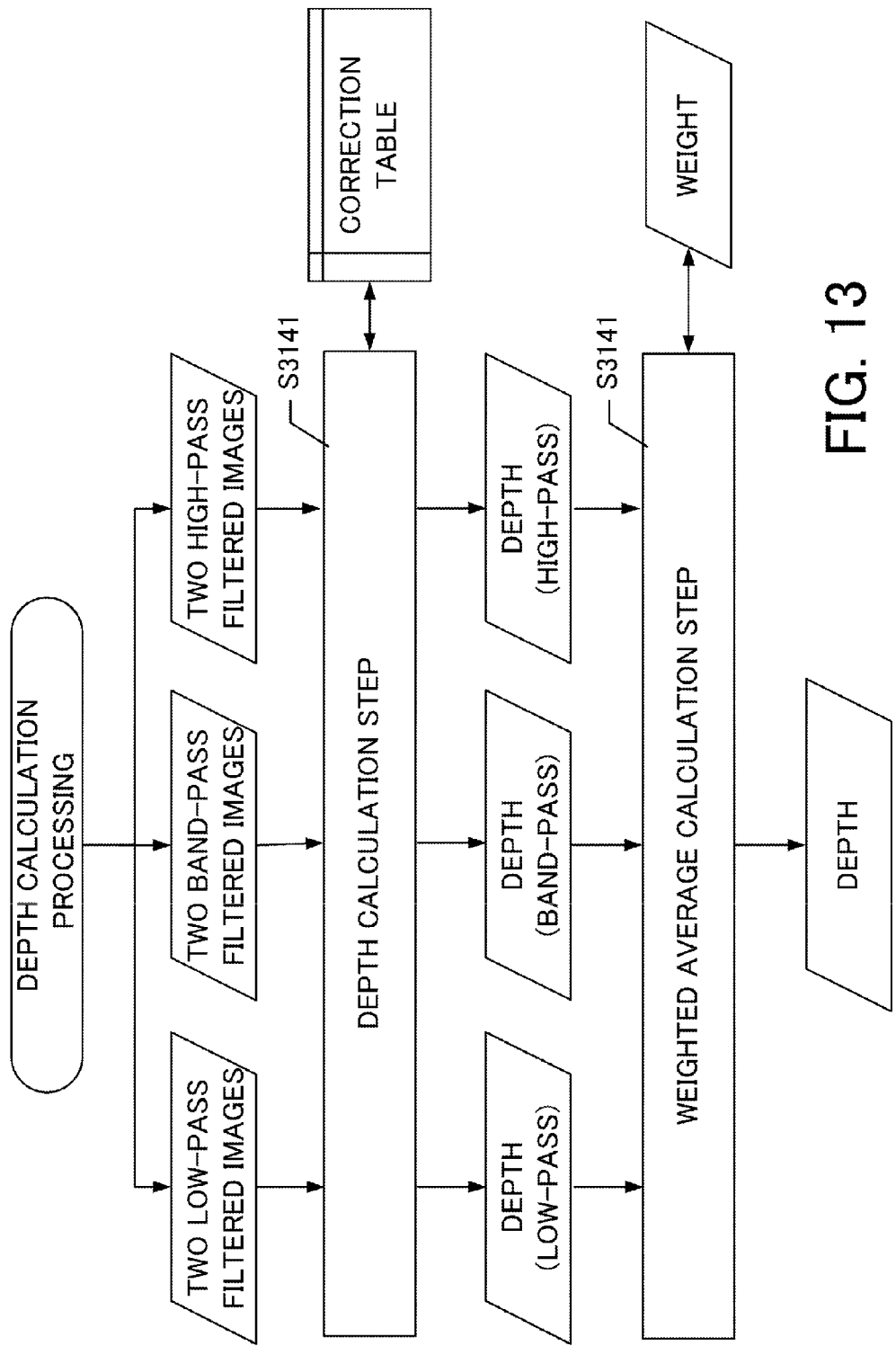
FIG. 13 is a flowchart showing the detail of depth calculation processing in the third embodiment.

As shown in the flowchart of FIG. 13, the depth calculation unit 314 calculates the depth based on the depth dependence value, the characteristic frequency band, and the imaging parameter in Step S3141 similarly to the first and second embodiments. The depth calculation processing is performed the number of times equal to the number of filters. Subsequently, the value of the weighted average of the depths is calculated by using the weight calculated in the weighting value calculation step S3123, and is set as the depth to the subject (Step S3142).

In the third embodiment, instead of selecting the specific frequency band as the characteristic frequency band, the depth to the subject is calculated based on the depth dependence values obtained from all of the results of the filtering by the filters prepared in advance. At this point, in the region image, as the number of frequency components transmitted through the filter is larger, the weighting value to the filtering result is increased. Consequently, as the number of frequency components included in the region image is larger, the filtering result of the frequency is largely reflected in the depth calculation, and hence it is possible to perform the depth calculation with high accuracy.

Note that, although it is described that the weighted average of all of the filtering results by the filters prepared in advance is calculated, it is not necessary to use all of the filtering results, and only a part of the filtering results may be weighted for calculating depth. In this case, first, it is determined which spatial frequency component is to be used for depth calculation, and the weighting value may be calculated only for the determined spatial frequency component.

In the present embodiment, the weighting value for each frequency is calculated based on the filtering result by the filters prepared in advance. However, similarly to the first embodiment, the region image may be transformed into the frequency space image by the Fourier transformation and the weight for each frequency may be calculated based on the result. For example, a plurality of the characteristic frequency bands may be determined after the image is transformed into the frequency space image, and the weighting value may be determined for each characteristic frequency band.

In the present embodiment as well, the depth of the subject does not need to be the depth on the object side, and the depth on the image side may be calculated as the depth of the subject. In addition, without calculating the depth from the depth dependence value, the depth dependence value may be outputted as it is. In a case where the depth dependence value is outputted, by calculating the weighted average of a plurality of the depth dependence values determined for the individual filters (spatial frequencies) with the weighting values corresponding to the individual filters (spatial frequencies), the depth dependence value to be outputted may be determined.

Fourth Embodiment

Figure 14:
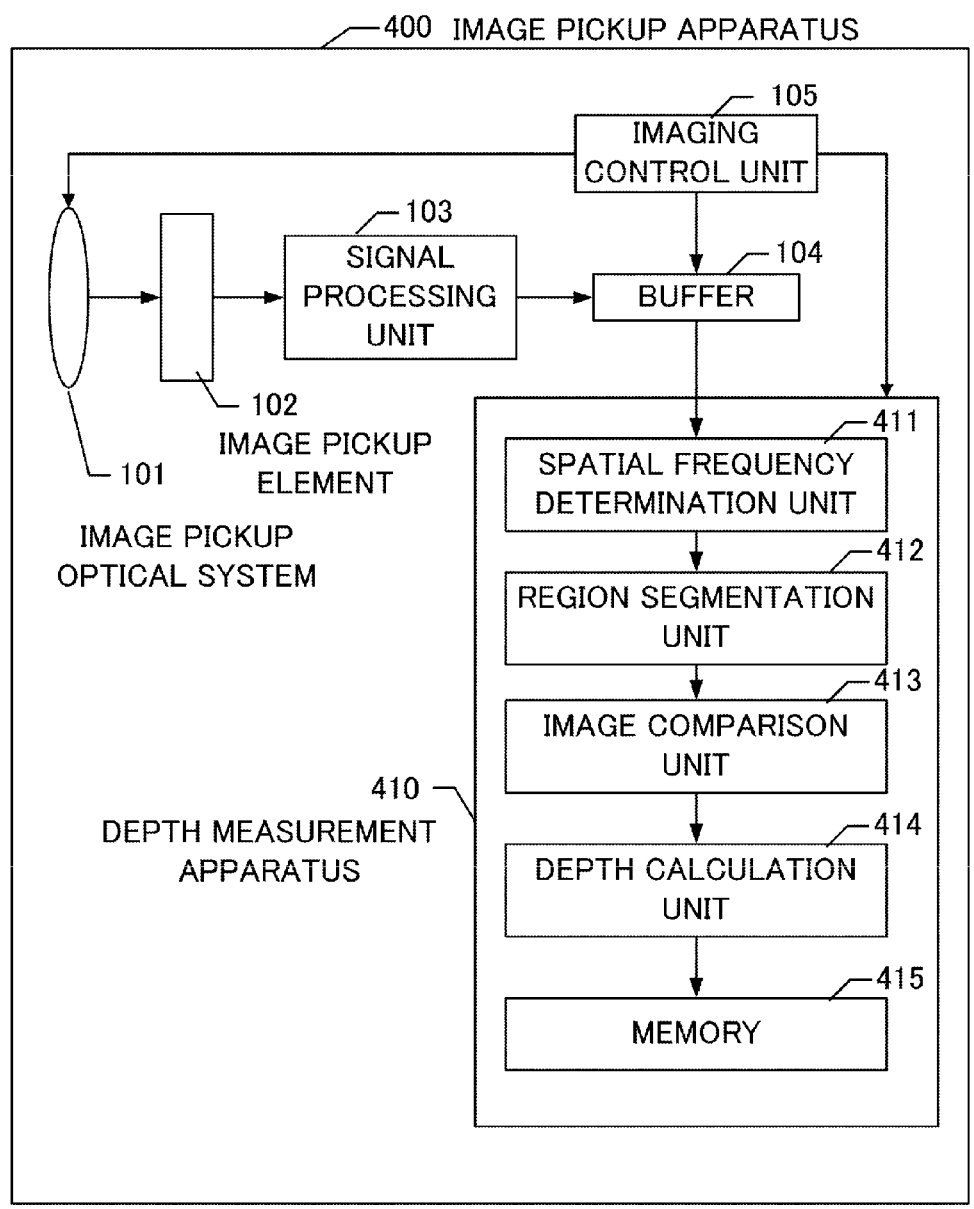
FIG. 14 is a block diagram showing the configuration of an image pickup apparatus according to a fourth embodiment.
Figure 15:
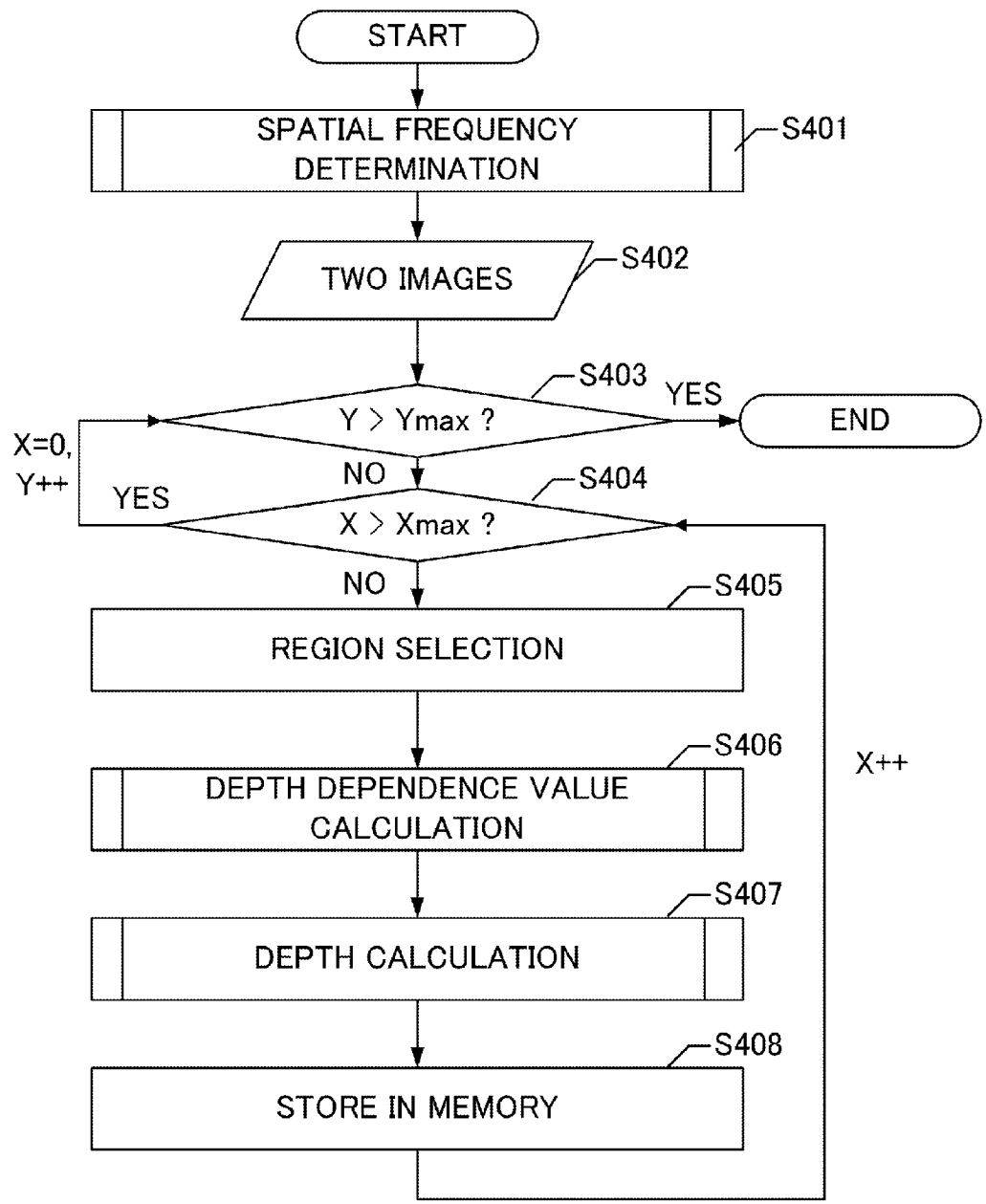
FIG. 15 is a flowchart showing the detail of depth calculation processing in the fourth embodiment.

FIG. 14 shows the configuration of an image pickup apparatus 400 according to the present embodiment. The depth measurement apparatus of the present embodiment is basically the same as that in the first embodiment, but is different from the first embodiment in the order of execution of the spatial frequency determination processing. In the present embodiment, the spatial frequency determination processing by a spatial frequency determination unit 411 is executed before the region selection processing by a region selection unit 412.

The depth calculation processing of a depth measurement apparatus 410 will be described by using the flowchart of FIG.

15. The broad flow of the depth calculation processing is as follows. First, the spatial frequency band used for the depth calculation is determined from the spatial frequency present in at least one of the two images. More specifically, the entire image is transformed into the frequency image, and the characteristic frequency band is determined (S401). Subsequently, the band-pass filter is applied to the two images by using the determined frequency band, and two images having been subjected to band limitation are obtained. Next, the image regions including the pixels required for the depth calculation processing are selected in the depth calculation target regions of the two images having been subjected to the band limitation (S405). Then, DFD method is applied to the spatial frequency band component of the characteristic frequency band of a plurality of images having different blurs, and the depth dependence value is calculated (S406). The depth to the subject is calculated based on the depth dependence value (S407). In this calculation, the depth to the subject is calculated with the correction corresponding to the above characteristic frequency band reflected in the calculation. The detail of each step is the same as in the first embodiment.

The present embodiment can be applied to the second embodiment and the third embodiment. In such cases, the band-pass filter in the real space that passes the determined spatial frequency band can be designed by using a window function method or a McClellan transformation.

As described above, in the depth measurement apparatus according to the present embodiment, the spatial frequency of the entire taken image is analyzed before the region selection, and DFD processing is performed by using the image from which the characteristic spatial frequency band included in the taken image is selected. With this, it is possible to reduce the number of times of the frequency analysis and the number of times of application of the band-pass filter, and it becomes possible to reduce the operation amount.

Fifth Embodiment

The configuration of the image pickup apparatus according to the present embodiment is the same as that of FIG. 14, but is different in the method for calculating the characteristic spatial frequency. Specifically, the operations of the depth measurement apparatus 410 are different and, among them, the operation of the spatial frequency determination unit 411 is different.

In the present embodiment, the frequency analysis in the frequency space is not performed, and the frequency band suitable for the depth measurement is determined in consideration of the defocus characteristic of the image pickup optical system and the maximum spatial frequency of the image pickup element. Hereinbelow, a detailed description will be given of the operation of the spatial frequency determination unit that is different from the operation of the fourth embodiment.

Figure 16:
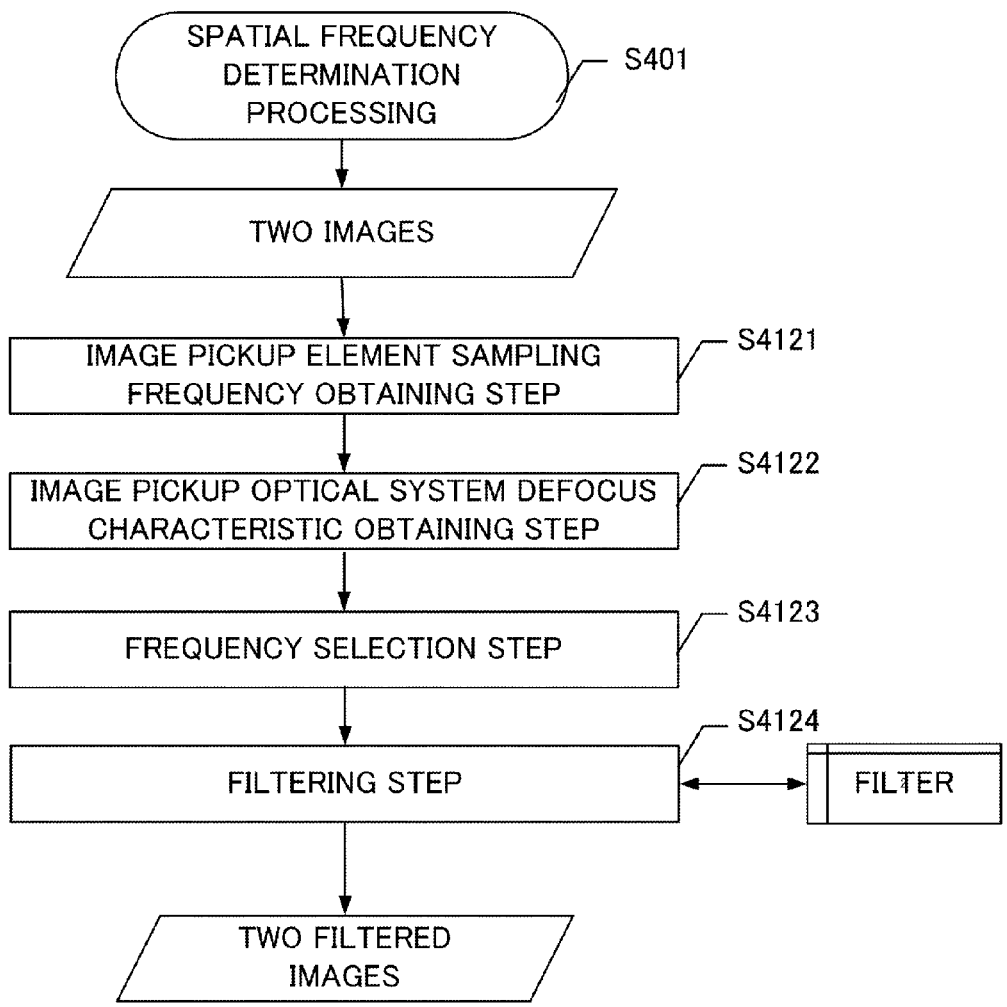
FIG. 16 is a flowchart showing the detail of spatial frequency determination processing in a fifth embodiment.

The detailed operation of the spatial frequency determination unit 411 will be described by using the flowchart of FIG. 16. First, in Step S4121, the sampling frequency of the image pickup element is confirmed. Subsequently, based on the sampling frequency of the image pickup element, a preferable range as the selected frequency is determined. Since noises occur in the image pickup element and the noises are conspicuous especially in high frequencies, when the high frequency band is selected for the image pickup element, the depth measurement accuracy is degraded by the noises. According to the examination by the present inventors, the maximum value of a selected frequency fc is preferably a Nyquist frequency fnq of the image pickup element, while the minimum value thereof is preferably not less than 30% of the Nyquist frequency.

$$0.3 \times fnq \leq fc \leq 1 \times fnq \quad \text{(Expression 6)}$$

Further, it is preferable to select a narrower band in this range. A selected bandwidth fb is preferably set to not less than 10% of the Nyquist frequency and not more than 40% thereof.

$$0.1 \times fnq \leq fb \leq 0.4 \times fnq \quad \text{(Expression 7)}$$

Next, in Step S4122, the degree of degradation of the contrast reduction for each frequency component with respect to the defocus of the image pickup optical system is obtained. Subsequently, based on the degree of the degradation, a range preferable as the bandwidth of the selected frequency band is determined. The higher the selected frequency band is, the more accurate the depth can be measured because the image pickup optical system has characteristics that defocus characteristics is larger as the frequency band is higher. However, there are cases where the degree of the degradation in the high frequency range with respect to the defocus is large depending on the image pickup optical system. Therefore, it is preferable to select the frequency band having proper characteristics related to the contrast degradation with respect to the defocus. Note that the frequency band may also be set in the range from the vicinity of the spatial frequency at which resolution evaluation is performed to the vicinity of the spatial frequency at which contract evaluation is performed at the time of the design.

In Step S4123, the frequency band that satisfies the frequency bands obtained in Step S4121 and Step S4122 is selected.

In Step S4124, the band-pass filter corresponding to the frequency band selected in Step S4123 is read, the filtering processing is performed on the two images, and the images having been subjected to the filtering are outputted.

In the present embodiment, it becomes possible to select the characteristic frequency band without performing the frequency analysis in which the image is transformed into the frequency space image by the Fourier transformation and the frequency analysis in which the filtering in the real space is used. Therefore, it becomes possible to enhance the accuracy in depth measurement without increasing the operation amount and the circuit scale.

Modification

For example, although the description has been given by using, as an example, the case where the depth measurement apparatus (image processing apparatus) is incorporated into the image pickup apparatus, this configuration is not essential. As long as a plurality of images taken under different imaging parameters and having different blurs can be acquired, the depth measurement apparatus may be configured in any manner. For example, the depth measurement apparatus may be incorporated into a computer having the image pickup apparatus, acquire images picked up by the image pickup apparatus, and perform the depth calculation based on the acquired images. Alternatively, the depth measurement apparatus may be incorporated into a computer capable of network access wiredly or wirelessly, acquire a plurality of images via the network, and perform the depth calculation based on the acquired images.

In addition, in each depth measurement apparatus of the above embodiments, the depth to the subject has been measured as the depth information on the subject. However, in a case where it is only necessary to be able to measure the relative depth of the subject (e.g., a case where the image is blurred based on the depth information on the subject), it is sufficient to measure the depth dependence value without measuring the depth to the subject. "The depth information on the subject" in the present specification may be any information as long as the information is associated with the distance to the subject (depth distance). For example, the depth information may be a depth on the object side (a distance between the subject and the focus position or the like), a depth on an image surface side (a defocus amount or the like), or an index value (score) obtained by the depth calculation according to DFD method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s).

This application claims the benefit of Japanese Patent Application No. 2012-109611, filed on May 11, 2012, and Japanese Patent Application No. 2013-64231, filed on Mar. 26, 2013, which are hereby incorporated by reference herein in their entirety.

What is claimed is:

1. A depth measurement apparatus for measuring depth information on a subject using a plurality of images having different blurs taken under different imaging parameters, the depth measurement apparatus comprising:
a region selection unit configured to select image regions including a processing target region from the plurality of images and to output the image regions as region selection images;
a spatial frequency determination unit configured to determine a spatial frequency band from spatial frequencies present in at least one of the region selection images; and
an image comparison unit configured to compare the plurality of images using a component of the spatial frequency band of the region selection images, and to output a depth dependence value dependent on a depth of the subject in the processing target region,
wherein the spatial frequency determination unit is configured
to transform the region selection images of the plurality of images into frequency space images,
to determine a characteristic frequency band serving as the spatial frequency band present in the region selection images for at least one of the plurality of images, and
to select the spatial frequency band used for outputting of the depth dependence value such that the characteristic frequency band is included in the spatial frequency band.

2. The depth measurement apparatus according to claim 1, wherein the spatial frequency determination unit is further configured to select, as the characteristic frequency band, the spatial frequency band having the largest value obtained by multiplying a spectral intensity by a frequency in the frequency space images.

3. The depth measurement apparatus according to claim 1, wherein the spatial frequency determination unit is configured to select, as the characteristic frequency band, the highest spatial frequency band among spatial frequency bands for which a multiplication of a spectral intensity of the frequency space image and a frequency exceeds a threshold.

4. A depth measurement apparatus for measuring depth information on a subject using a plurality of images having different blurs taken under different imaging parameters, the depth measurement apparatus comprising:
a region selection unit configured to select image regions including a processing target region from the plurality of images and to output the image regions as region selection images;
a spatial frequency determination unit configured to determine a spatial frequency band from spatial frequencies present in at least one of the plurality of images; and
an image comparison unit configured to compare the plurality of images using a component of the spatial frequency band of the region selection images, and to output a depth dependence value dependent on a depth of the processing target region of a region selection image based on the component of the spatial frequency band,
wherein the spatial frequency determination unit is configured
to transform at least one of the plurality of images into a frequency space image,
to determine a characteristic frequency band serving as the spatial frequency band present in at least one of the plurality of images, and
to select the spatial frequency band used for outputting of the depth dependence value such that the characteristic frequency band is included in the spatial frequency band.

5. A depth measurement apparatus, for measuring depth information on a subject using a plurality of images having different blurs taken under different imaging parameters, the depth measurement apparatus comprising:
a region selection unit configured to select image regions including a processing target region from the plurality of images and to output the image regions as region selection images;
a spatial frequency determination unit configured to determine a spatial frequency band from spatial frequencies present in at least one of the region selection images and to apply a plurality of filters, prepared in advance, that pass different spatial frequency bands, on the region selection images; and
an image comparison unit configured to compare the plurality of images using a component of the spatial frequency band of the region selection images that passed through at least one of the plurality of filters, and to output a depth dependence value dependent on a depth of the subject in the processing target region,
wherein the spatial frequency determination unit is configured
to apply the plurality of filters prepared in advance that pass the different spatial frequency bands, sequentially from the filter passes the highest spatial frequency band in descending order, and
to determine the spatial frequency band transmitted through the first filter with which an outputted value exceeds a predetermined threshold, as the spatial frequency band used for outputting of the depth dependence value.

6. The depth measurement apparatus according to claim 4, wherein the spatial frequency determination unit is configured to apply a plurality of filters prepared in advance that pass different spatial frequency bands, on at least one of the plurality of images, and to determine the spatial frequency band passed through at least one of the plurality of filters, as the spatial frequency band used for the outputting of the depth dependence value.

7. A depth measurement apparatus for measuring depth information on a subject using a plurality of images having different blurs taken under different imaging parameters, the depth measurement apparatus comprising:

a spatial frequency determination unit configured to determine a spatial frequency band from spatial frequencies present in at least one of the plurality of images;

a depth determination unit configured to determine the depth information on the subject from the depth dependence value and the spatial frequency band; and an image comparison unit configured to compare the plurality of images using a component of the spatial frequency band of the plurality of images, and to output a depth dependence value dependent on a depth of the subject, wherein the depth determination unit is configured to convert the depth dependence value into a depth based on the imaging parameter and the spatial frequency band determined by the spatial frequency determination unit.

8. A depth measurement apparatus for measuring depth information on a subject using a plurality of images having different blurs taken under different imaging parameters, the depth measurement apparatus comprising:

a spatial frequency determination unit configured to determine a spatial frequency band from spatial frequencies present in at least one of the plurality of images;

a depth determination unit configured to determine the depth information on the subject from the depth dependence value and the spatial frequency band; and an image comparison unit configured to compare the plurality of images using a component of the spatial frequency band of the plurality of images, and to output a depth dependence value dependent on a depth of the subject, wherein the depth determination unit is configured to determine the depth by referring to a table in which a relationship of the depth dependence value, the imaging parameter, the spatial frequency band, and the depth is pre-stored.

9. A depth measurement apparatus for measuring depth information on a subject using a plurality of images having different blurs taken under different imaging parameters, the depth measurement apparatus comprising:

a spatial frequency determination unit configured to determine a predetermined spatial frequency band including a frequency fc and a bandwidth fb satisfying the following expressions; and an image comparison unit configured to compare the plurality of images using a component of the predetermined spatial frequency band of the plurality of images, and to output a depth dependence value dependent on a depth:

$$0.3 \times fnq \leq fc \leq 1 \times fnq$$

$$0.1 \times fnq \leq fb \leq 0.4 \times fnq$$

wherein fnq represents a Nyquist frequency of an image pickup element that has picked up the plurality of images.

10. A depth measurement apparatus for measuring depth information on a subject using a plurality of images having different blurs taken under different imaging parameters, the depth measurement apparatus comprising:

a weighting value determination unit configured to determine weighting values for a plurality of spatial frequency bands from a spatial frequency present in at least one of the plurality of images; and an image comparison unit configured to compare the images using a spatial frequency band component of the plurality of images, to determine depth dependence values by calculating a weighted average of depth dependence values of the spatial frequency bands using the weighting values for the respective spatial frequency bands, and to output a depth dependence value dependent on a depth for each of the plurality of spatial frequency bands.

11. A depth measurement apparatus for measuring depth information on a subject using a plurality of images having different blurs taken under different imaging parameters, the depth measurement apparatus comprising:

a weighting value determination unit configured to determine weighting values for a plurality of spatial frequency bands from a spatial frequency present in at least one of the plurality of images;

an image comparison unit configured to compare the images using a spatial frequency band component of the plurality of images, and to output a depth dependence value dependent on a depth for each of the plurality of spatial frequency bands; and a depth determination unit configured to determine the depth based on the plurality of depth dependence values, the plurality of spatial frequency bands, and the weighting values for the respective spatial frequency bands.

12. The depth measurement apparatus according to claim 11, wherein the depth determination unit is configured to determine depths for each of the plurality of spatial frequency bands based on the depth dependence value and the spatial frequency band, and to determine the depth to the subject in a processing target region by taking a weighted average of the depths determined for each of the spatial frequency bands using the weighting values for the spatial frequency bands.

13. A depth measurement apparatus for measuring depth information on a subject using a plurality of images having different blurs taken under different imaging parameters, the depth measurement apparatus comprising:

a weighting value determination unit configured to determine weighting values for a plurality of spatial frequency bands from a spatial frequency present in at least one of the plurality of images; and an image comparison unit configured to compare the images using a spatial frequency band component of the plurality of images, and to output a depth dependence value dependent on a depth for each of the plurality of spatial frequency bands, wherein the weighting value calculation unit is configured to apply a plurality of filters prepared in advance that pass different frequency bands, on a region selection image, and to determine the weighting value for each of the frequency bands corresponding to the filters according to a statistic of an outputted value.

14. An image pickup apparatus comprising:

an image pickup unit; and the depth measurement apparatus according to claim 9, wherein the depth measurement apparatus is configured to measure depth information on a subject in a processing target region based on a plurality of images taken under different imaging parameters using the image pickup unit and having different blurs.

15. A depth measurement method for measuring depth information on a subject by using a plurality of images having different blurs taken under different imaging parameters, the depth measurement method comprising:

a spatial frequency determination step of determining a predetermined spatial frequency band such that a frequency fc included in the predetermined spatial frequency band and a bandwidth fb of the predetermined spatial frequency band satisfy the following expressions; and an image comparison step of comparing the plurality of images using a component of the predetermined spatial frequency band of the plurality of images, and outputting a depth dependence value dependent on a depth:

$$0.3 \times f_{nq} \leq f_c \leq 1 \times f_{nq}$$

$$0.1 \times f_{nq} \leq f_b \leq 0.4 \times f_{nq}$$

wherein fnq represents a Nyquist frequency of an image pickup element that has picked up the plurality of images.

16. A non-transitory computer readable medium that stores a program, wherein the program causes a computer to execute the steps of the method according to claim 15.

* * * * *